US006333509B1

(12) United States Patent
Lumpp

(10) Patent No.: US 6,333,509 B1
(45) Date of Patent: Dec. 25, 2001

(54) ELECTROMAGNETIC RADIATION TRANSMITTER/REFLECTOR DEVICE, APPARATUS AND PROCESS IMPLEMENTING SUCH A DEVICE

(75) Inventor: Christian Lumpp, Rumilly (FR)

(73) Assignee: Lumpp & Consultants, Rumilly (FR)

( * ) Notice: Subject to any disclaimer, the term of this patent is extended or adjusted under 35 U.S.C. 154(b) by 0 days.

(21) Appl. No.: 09/202,154

(22) PCT Filed: Jul. 9, 1997

(86) PCT No.: PCT/FR97/01251

§ 371 Date: Dec. 9, 1998

§ 102(e) Date: Dec. 9, 1998

(87) PCT Pub. No.: WO98/01700

PCT Pub. Date: Jan. 15, 1998

(30) Foreign Application Priority Data

Jul. 9, 1996 (FR) .................................................. 96 08556
Dec. 27, 1996 (FR) .................................................. 96 16139

(51) Int. Cl.$^{7}$ ........................................................ G01J 1/00
(52) U.S. Cl. ........................................................ 250/504 R
(58) Field of Search ............................ 250/504 R, 493.1, 250/494.1

(56) References Cited

U.S. PATENT DOCUMENTS 2,254,962 9/1941 Harris et al. .
4,591,724 * 5/1986 Fuse et al. ...................... 250/504 R
4,591,958 * 5/1986 Lamboo .......................... 250/504 R
4,596,935 6/1986 Lumpp .
5,008,593 4/1991 Schlie et al. .
5,103,381 4/1992 Uke .
5,489,819 * 2/1996 Sakai et al. ..................... 250/504 R
5,712,487 * 1/1998 Adachi et al. .................. 250/504 R
5,945,680 * 8/1999 Jensen ............................ 250/504 R

FOREIGN PATENT DOCUMENTS 29 40 632 A1 11/1982 (DE) .
33 01 395 C1 1/1984 (DE) .
42 05 183 A1 8/1993 (DE) .
0 457 242 A1 11/1991 (EP) .
0 534 853 A1 3/1993 (EP) .
0 709 620 A1 5/1996 (EP) .

* cited by examiner

*Primary Examiner*—Kiet T. Nguyen
(74) *Attorney, Agent, or Firm*—Oliff & Berridge, PLC

(57) ABSTRACT

An electromagnetic radiation transmitter/reflector device (1), an apparatus and a process implementing such as device. The device comprises a straight transparent quartz tube (2) with an end-to-end bore (3) for retaining a pressurised ionising gas extending therethrough around an axis (4) and defining the cross section of the radiation transmitter beam, and a surface (7) for reflecting the transmitted radiation, comprising two longitudinal side wings (14) symmetrical in relation to an axial plane (10) of the bore, said reflecting portion being at least partially secured to the tube.

46 Claims, 30 Drawing Sheets

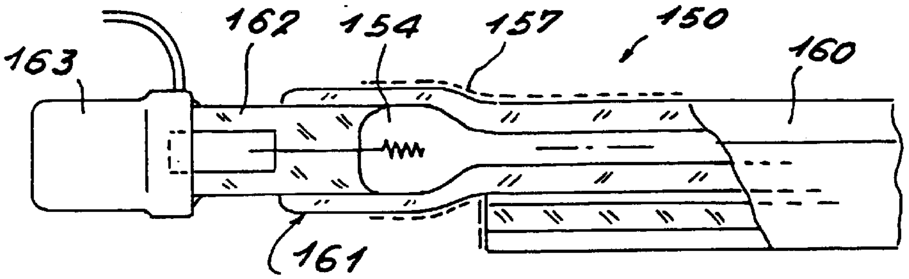
FIG. 28
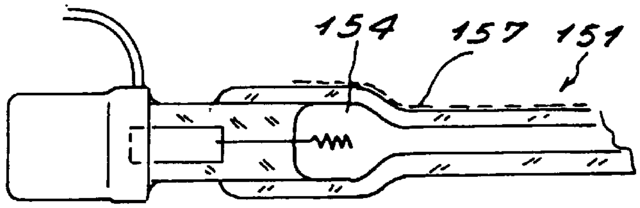
FIG. 29
FIG. 30
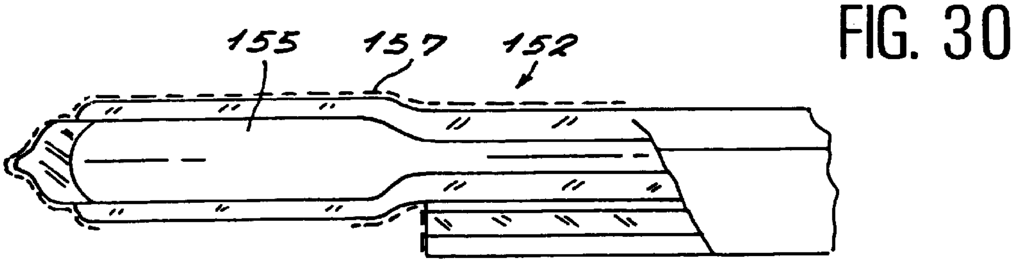
FIG. 31A
FIG. 31
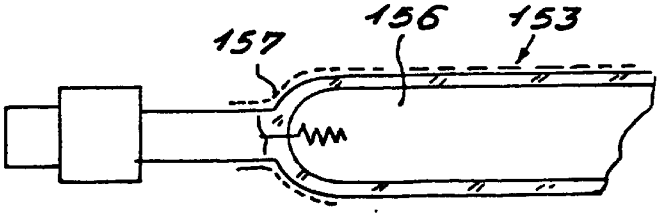
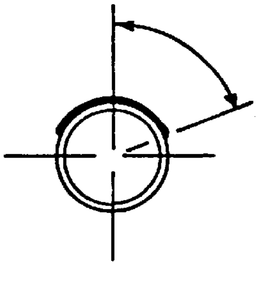

ELECTROMAGNETIC RADIATION TRANSMITTER/REFLECTOR DEVICE, APPARATUS AND PROCESS IMPLEMENTING SUCH A DEVICE

BACKGROUND OF THE INVENTION

1. Field of the Invention

The present invention relates to an ultraviolet electromagnetic radiation transmitter/ reflector device comprising a straight glass tube with an end-to-end bore for retaining a pressurised ionising gas, extending therethrough around an axis and defining a radiation transmitter beam.

2. Description of Related Art

It also relates to apparatuses and a process implementing such a device. The invention finds a particularly important, although non-exclusive, application in the field of photochemical treatment of materials by ultraviolet radiation with transmitter tubes containing an ionising gas at high or medium pressure, for example used in the paper industry, textiles, plastics industry, food industry, automobile industry and in the printing field, in particular for polymerization of inks or varnishes on films, for example formed by rolls of paper or cardboard By high or medium pressure we mean absolute gas pressures greater than or equal to 2 $kg/cm^2$,for example 3 $kg/cm^2$ for a medium pressure and greater than 5 $kg/cm^2$ for a high pressure, being able for example to go up to 100 $kg/cm^2$.

The invention is not limited to the types of products to be treated. It can for example be used for drying of plated products, for drying of certain varnishes and adhesives, for drying of wire products extending around an axis, or for sterilization of liquid products.

Devices for production and reflection of ultraviolet radiations are already known comprising a straight transmitter tube and a straight concave reflector having a parabolic cross section or an elliptic cross section.

These devices present drawbacks. They are in fact cumbersome and require a transmitter tube completely separated from the reflector by a distance of several millimetres to enable efficient cooling by air flow between the transmitter tube and reflector.

High temperatures from 600 to 900° are in fact observed on the ultraviolet transmitter, whereas the temperature of the reflector is much lower, for example about 50° C.

The materials used are moreover different, the transmitters being made of glass and the reflectors of reflecting metal, of the aluminium type, i.e. presenting a very different thermal expansion coefficient from that of glass.

The tubes of great length of the devices of the prior art moreover present buckling with time.

In the case more particularly concerned by the invention, i.e. ultraviolet radiation transmission, known transmitters also cause formation of ozone in non-negligible quantity.

SUMMARY OF THE INVENTION

The object of the present invention is to provide a radiation transmitter/reflector device, an apparatus and a process implementing such a device, meeting the requirements of practice better than those known before, in particular in that it proposes a compact device which is not cumbersome, able to considerably limit ozone production while maximizing the usable photochemical energy due to a structural design enabling an excellent optimization of the energy efficiency of the transmitted radiation.

For this purpose, the invention proposes in particular an ultraviolet radiation transmitter/reflector device comprising a straight glass tube with an end-to-end bore for retaining an ionising gas under high or medium pressure, extending around an axis, and defining a radiation transmitter beam, and a surface for reflecting the transmitted radiation comprising two longitudinal side wings symmetrical in relation to an axial plane of the bore, the reflecting surface being at least partially secured to the transmitter tube and presenting a transverse cross section at least partially parabolic, elliptic or straight, or then again at least partially appreciably parabolic, appreciably elliptic or appreciably straight, characterized in that the portions of reflecting surface corresponding to the side wings and presenting a transverse cross section at least partially parabolic or elliptic, or then again at least partially appreciably parabolic or appreciably elliptic, belong to a curve (parabola or ellipse) whose generating line at the peak is situated at a distance d from the axis of the bore, such that:

d=f and O<d<r+e+1 mm with f: distance between the focal point of the parabola or ellipse and the corresponding generating line at the peak, r: distance between the axis and the internal surface of the bore in the axial plane of the bore passing through the generating line at the peak, and e: thickness of the tube in the axial plane, on the same side as and passing through the generating line at the peak.

Even more advantageously, both of the two end portions of the side wings present a cross section strictly in the form of a portion of parabola or ellipse or strictly straight. In the embodiments more particularly described, the present invention implements a straight transmitter tube whose geometric transmission centre is the same as the corresponding reflector focal point, also straight and of at least partially parabolic cross section (for example to treat flat surfaces), or of at least partially elliptic cross section (for example to treat curved surfaces), the generating line at the peak of the reflection curve being parallel to the axis merged with the focal line, and the end edges of the parabolic or elliptic portions being situated below the generating line of the bore, on the other side from the latter in relation to said generating line at the peak.

More precisely the medium or high pressure ultraviolet transmitters of the invention more particularly described here are tubes called "discharge tubes" comprising electrodes at very high temperature (greater than 1000° C.) called "hot electrodes". The transmitter is therefore not provided with any filament of the infrared transmitter filament type.

The electric arc generated by the two electrodes, respectively situated on each side of the transparent tube, generates a light cylinder of constant cross section generally formed by one or more metallic iodides in plasma state, or by xenon or a mercury/xenon mixture or other gases or rare earths, each end of the cylinder being in the form of light cones whose peaks are merged with the electrodes.

The light cylinder, which can advantageously be truncated, for example flattened, as will be seen, presents a total length formed by the distance between the two electrodes, for example comprised between a few mm for short arc transmitters and more generally between 30 mm and 2500 mm, and also presents for example a cross section of the same size as, or smaller than, the internal cross section of the transparent tube which houses it.

The metallic iodide(s) can come from pure metals or alloys i.e. and e.g. a pure mercury, a pure iron, a pure gallium, an iron/cobalt (mixture), a gallium/lead (mixture), a mercury/gallium (mixture) etc.

More generally the gas(es) used can be pure (for example xenon) or in mixture form (for example mercury/xenon).

The list of mixtures of metals, rare earths and/or gases given above is naturally not restrictive.

Moreover their respective proportion is determined according to the required radiation wavelengths, in a manner known in itself.

In advantageous embodiments recourse is in addition had to one and/or the other of the following arrangements:

$d=r+e$;

$r \leqq d < r+e$;

$d \leqq r$;

the bore is cylindrical;

the cross section of the bore is an at least partially truncated circle, so that the radiating beam is of truncated transverse cross section;

the cross section of the bore is truncated by one or two dioptric planes perpendicular to the axial plane of the bore, in such a way that the beam is for example of appreciably rectangular shape inscribed in a cylinder (case where it is doubly truncated);

the reflecting surface is securedly united to the tube;

the external wall of the tube comprises a protruding part in the form of a cupola, hereinafter called dome, of external surface adapted to the internal wall of the bore and arranged, for example being a portion of a cylinder in the case of a cylindrical bore, to send the primary radiation transmitted to the dome back to the focal point in general merged with the axis of the bore, to operate in a form called inverse radiation, said dome being symmetrical in relation to the axial plane of the bore, situated on the same side as the generating line at the peak in relation to the bore, and covered with a layer of reflecting material;

the tube is solid between the end portions of the side wings whose external faces form at least partially said reflecting surface by dioptric refraction;

the reflecting surface is entirely covered with a layer of reflecting material;

the reflecting surface is of parabolic or partially parabolic transverse cross section and the tube comprises an external face, called lower face, joining the ends of the wings, situated on the opposite side from the generating line at the peak in relation to the bore, flat and perpendicular to the axial plane containing said generating line at the peak;

the reflecting surface is of elliptic or partially elliptic transverse cross section and the tube comprises an external face joining the ends of the wings, situated on the opposite side from the generating line at the peak in relation to the bore, convex, according to a curve symmetrical in relation to the axial plane containing the generating line at the peak, said external face being arranged to direct the transmitted rays towards the axial plane of the bore, for example towards the second focal point of the ellipse;

the transverse cross section of the external face is straight over a first part, perpendicular and centred in relation to the axial plane, and curved over a second part;

the tube comprises, on the opposite side from the generating line at the peak, a portion of partially recessed solid glass, forming a longitudinal dioptric cavity;

said cavity comprises a concave upper face in the form of a portion of cylinder, having the same axis as the axis of the bore, and for example of radius equal to $r+e_1$ and side face parallel to the axial plane of the bore over a height inscribed in an angle at the centre $\alpha_2$, said angle $\alpha_2$ being the angle for which the primary radiation from the plasma beam is entirely refracted by the dioptric plane of the lower face, joining the wings of the device.

By avoiding transmitting in the angle $\alpha_2$ we thus avoid significantly losing radiation;

the dioptric cavity comprises a convex lower face in the form of a portion of cylinder, whose axis is situated on the opposite side from the axis of the bore, and the radius of curvature is arranged to direct the light rays in one or more set directions, for example parallel to the axial plane or towards the second focal plane of the ellipse;

the dome comprises a reflecting external face situated at a distance x from the axis of the bore, such that:

$r < x \leqq 2y$ with y: distance between the internal surface of the bore and the point of discontinuity of the slope of the reflecting surface of the wing between dome and parabolic or elliptic portion;

the device comprises in addition two reflecting longitudinal side plates, situated on each side of the ends of the wings, symmetrically in relation to the axial plane;

the bore comprises an internal face, on the opposite side from the generating line at the peak in relation to the axis, provided with a longitudinal dioptric recess presenting a lower wall in the form of a portion of cylinder of radius, for example $r'>r$ and side walls parallel to the axial plane of the bore. But r' can also be equal to or less than r;

the tube is in the shape of a cylinder provided with two longitudinal side lugs, symmetrical in relation to the axial plane passing via the generating line at the peak, directed towards the irradiation plane and whose respective external surfaces form the wings of parabolic or elliptic portion;

the lugs are securedly affixed to the tube;

the lugs are separable from the tube which is for example cylindrical, and comprise joining faces in the form of a concave cylinder portion, of a shape complementary to the external face of the tube with which they may or may not be in contact;

the external faces of the lugs are perpendicular to the axial plane containing the generating line at the peak;

the end faces of the lugs are concave and arranged to direct the incident radiation onto said faces towards the axial plane of the bore containing the generating line at the peak;

the cylindrical bore comprises on its internal surface opposite the generating line at the peak, two protuberances of appreciably triangular section, presenting one side parallel to the axial plane, and the other situated on the same side as said axial plane, in the form of a convex curved portion, said protuberances being symmetrical in relation to the axial plane containing the generating line and such that the sides of the angle at the centre of the bore $\alpha_2$ in which they are inscribed pass through the two end peaks of the corresponding lug;

the upper portion of the external surface of the tube is covered with reflecting material, for example over an angle at the centre $2\alpha_5$ in relation to the bore axis, $\alpha_5$ being defined as specified hereafter in the description, the two side wings being entirely situated at a distance from the transmitter tube, for example in such a way that a circulating flow of a cooling gas is arranged between the tube and the reflecting side wings;

the wings present an at least partially parabolic or elliptic cross section, are respectively extended at the upper part by a cylindrical portion coaxial with the bore, entirely situated at a distance from the transmitter tube.

In this case the upper portion of the external surface of the tube is covered with reflecting material over an angle $\alpha'_5$ smaller than as completing the parts of cylinders;

the two side wings are flat;

the two side wings are formed by flat longitudinal reflecting plates;

the tube comprises electrode chambers of internal cross section greater than or equal to the internal cross section of the radiation transmitter beam, for example ≧1.5 times the latter, or example ≧2 times, and for example 6 times greater;

the cross section of the transmitter beam is smaller than or equal to about 45 $mm^2$, or about 30 $mm^2$, or even more precisely 10 $mm^2$, or even 3 $mm^2$;

the beam is in the form of a longitudinal slit of rectangular or appreciably rectangular cross section of a width smaller than half of the length, for example than ⅕th or 1/10th of the length;

the maximum diameter or transverse dimension of the internal section of the tube radiation transmitter beam over the useful arc length is smaller than or equal to 9 mm, ≦to about 6 mm, ≦about 4 mm or even ≦about 2 or even 1 mm, for example 0.5 mm.

The invention proposes in addition apparatuses for processing and in particular for drying products arranged as a flat or curved sheet, comprising at least one device of the type described above, and a process for applying radiation to a product running in continuous or semi-continuous manner using such a device.

The invention also proposes a process for applying radiation to a product arranged as a sheet or on a flat or curved surface, characterized in that the product is irradiated with a plasma beam of ultraviolet rays of cylindrical or appreciably cylindrical shape extended around an axis, of constant circular or partially truncated cross section, of the radiation transmitter beam smaller than 45 $mm^2$, and for example presenting a maximum radial dimension smaller than or equal to about 9 mm.

The plasma beam is in fact a beam elongate around an axis whose peripheral shape is influenced by the shape of the external wall of the bore which contains it, a shape itself and for example of appreciably circular uniform cross section, then resulting in an appreciably cylindrical shape.

By constant cross section, we mean a constant transverse cross section over the useful arc length of the beam, therefore not including the electrode chambers.

The product is advantageously irradiated with a plasma beam of ultraviolet rays of cylindrical or appreciably cylindrical shape extended around an axis, of constant circular cross section and smaller than or equal to 30 $mm^2$,or even 10 $mm^2$,for example presenting a maximum radial dimension smaller than or equal to about 4 mm, smaller than or equal to about 2 mm, or even smaller than or equal to about 1 mm, only the physical manufacturing limits of a glass tube having to be taken into account.

In an advantageous embodiment the product is irradiated with primary rays coming directly from the plasma beam and at the same time with secondary rays originating from the primary rays by dioptric refraction on a reflecting wall presenting an at least parabolic or elliptic transverse cross section.

Also advantageously the product is irradiated with rays coming entirely from and reflected by a single tube confining the plasma beam, comprising a reflecting surface secured to the transmitter tube of said plasma beam, defining an inverse light image, rendered possible by the absence of filament.

The concept of inverse light image which will also be explained in detail hereinafter, means that the primary rays transmitted at the level of the axis of the beam by the plasma beam are reflected in the form of secondary rays, which are superposed, appreciably or exactly, with the primary rays transmitted in the other direction by said beam.

Irradiation is advantageously performed with a plasma cylinder of cylindrical cross section truncated on two sides, on one side or comprising a convex curved cross section at the lower part perpendicular to the axial plane.

The length of the plasma beam of constant cross section is advantageously greater than thirty centimetres, is greater than one metre, and advantageously greater than 2 metres, or even 3 metres.

In an advantageous embodiment the linear voltage has a value greater than or equal to 50 Volts/cm, advantageously greater than or equal to 100 Volts/cm.

Even more advantageously a length of plasma beam greater than 1 m 50 and a linear voltage greater than 20 Volts/cm, for example 80 Volts/cm, are associated in combination.

In an advantageous embodiment, the radius of the cross section of the cylindrical plasma beam in relation to the equivalent diameter d of the tube is such that $$\frac{1}{100}d \le r \le \frac{1}{2}d \text{ for example } \frac{1}{50}d \le r \le \frac{1}{4}d \text{ or}$$

$$r \le \frac{1}{8}d,\ r \le \frac{1}{10}d \text{ and/or } r \ge \frac{1}{20}d$$

In an also advantageous embodiment, the beam of small diameter of the type described above is incorporated in a device comprising a surface reflecting the transmitted rays comprising two longitudinal side wings symmetrical in relation to an axial plane of the bore, the reflecting surface presenting a cross section at least partially parabolic, elliptic or straight, or at least partially appreciably parabolic, appreciably elliptic or appreciably straight, characterized in that the two wings are separated at the upper part by a longitudinal middle space or slit extending on each side of the upper generating line of the wings, for example partially hyperbolic or parabolic, for supply of cooling air, said space being covered at a distance by a flat plate, i.e. flat and horizontal reflecting the rays transmitted by said beam having passed through the slit.

BRIEF DESCRIPTION OF THE DRAWINGS

Advantageously the plate is perforated and also acts as support for the wings, the conditions 0<d<r+e+1 mm moreover being complied with.

The invention will be more easily understood on reading of the following description of several embodiments given as non-restrictive examples only.

The description refers to the accompanying drawings in which:

FIGS. 1 to 5 are cross sectional views of alternative versions of a first embodiment of a monoblock transmitter/reflector according to the invention, comprising a reflecting surface of completely or partially parabolic cross section.

FIGS. 6 to 10 are cross sectional views of alternative versions of a second embodiment of a monoblock transmitter/reflector according to the invention, comprising a reflecting surface of completely or partially elliptic cross section.

Figure 11:
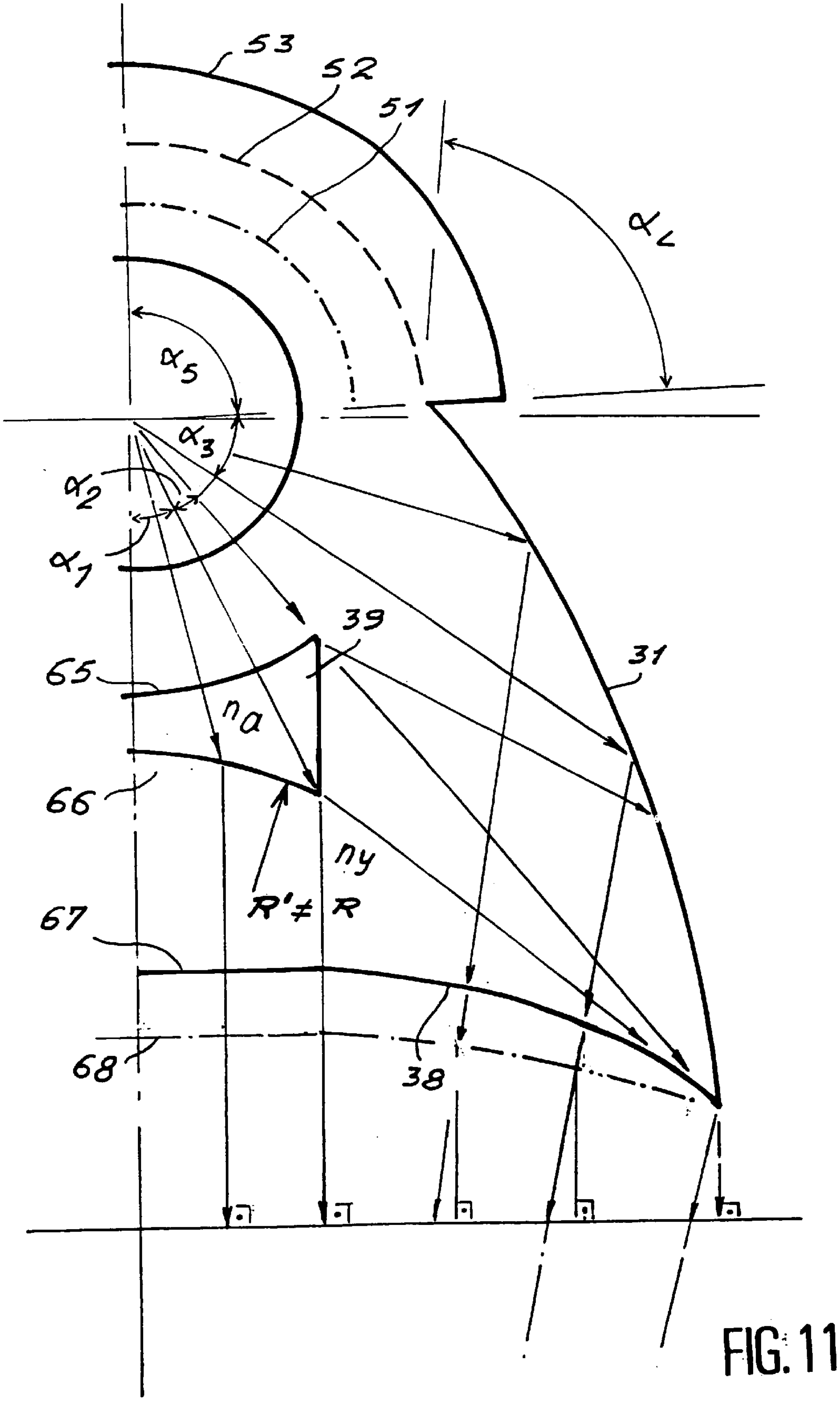

FIG. 11 illustrates other alternative versions of the second embodiment, with upper cylindrical domes of different thicknesses.

Figure 12:
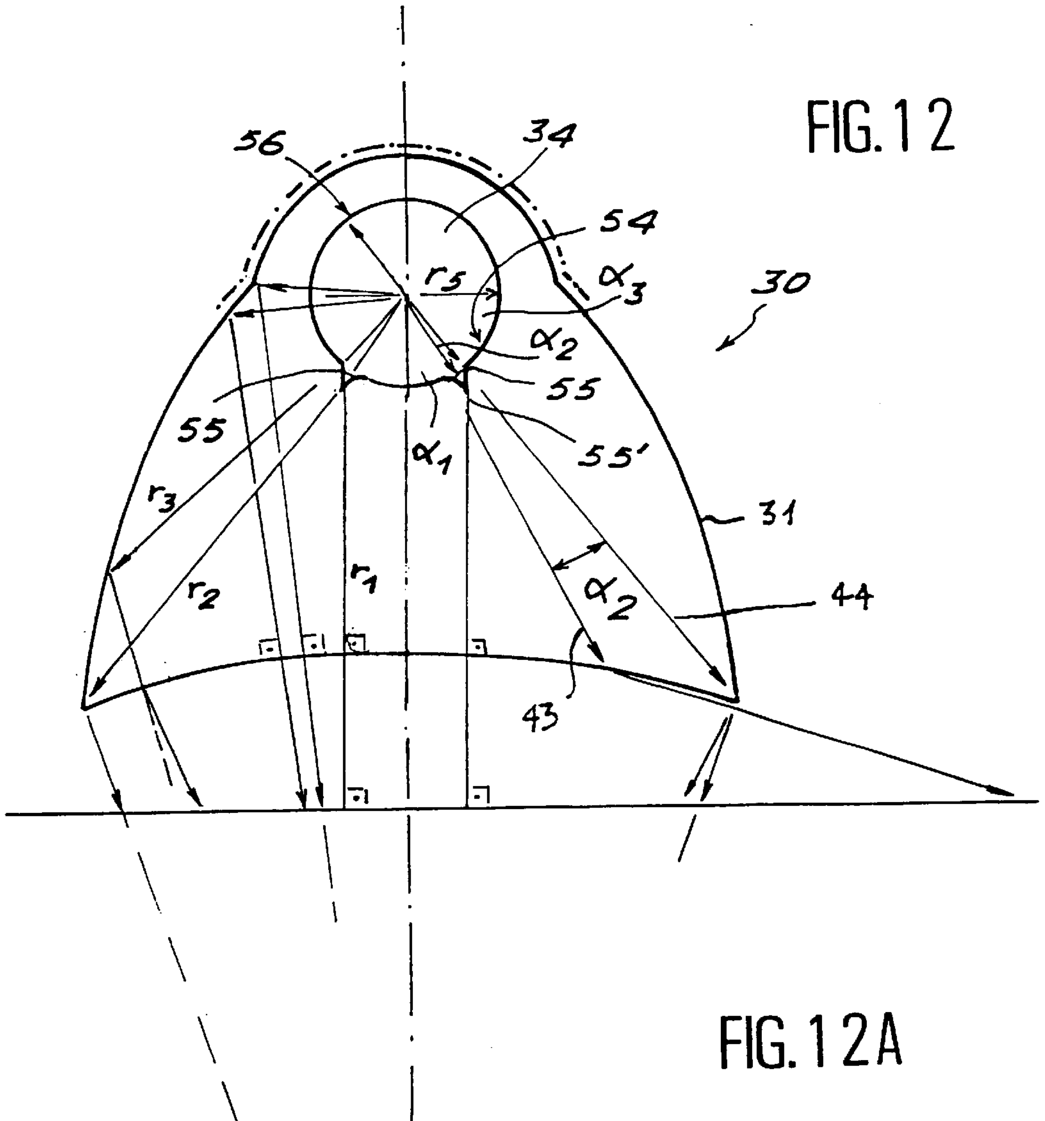
Figure 12A:
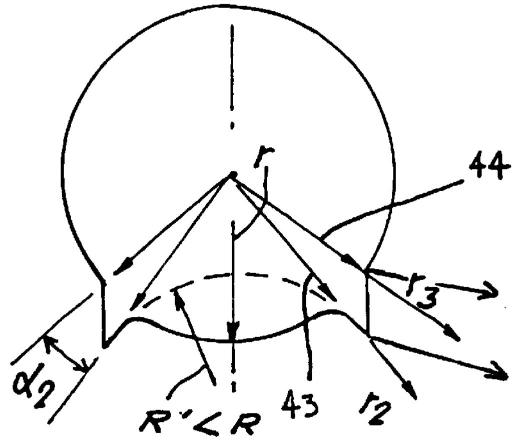

FIGS. 12 and 12A illustrate an alternative version of the second embodiment.

Figure 13:
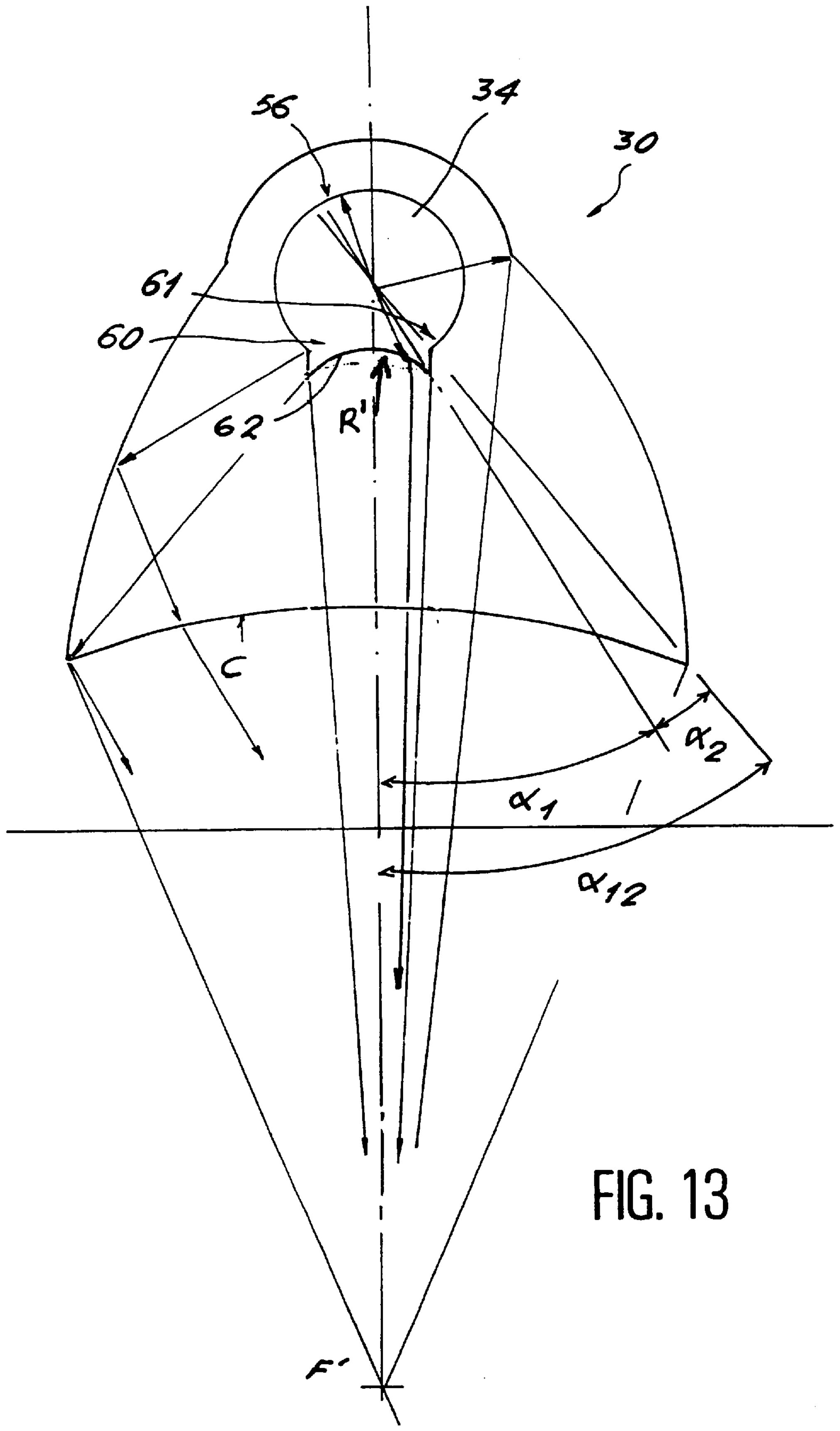

FIG. 13 is another alternative version of the second embodiment.

Figure 14:
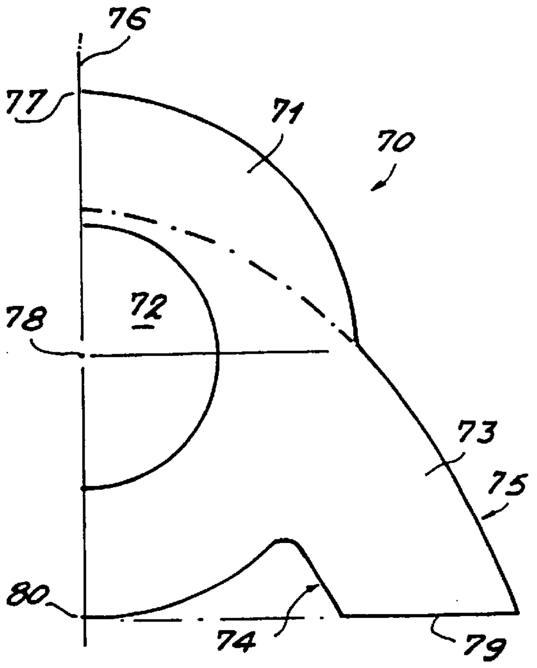
Figure 15:
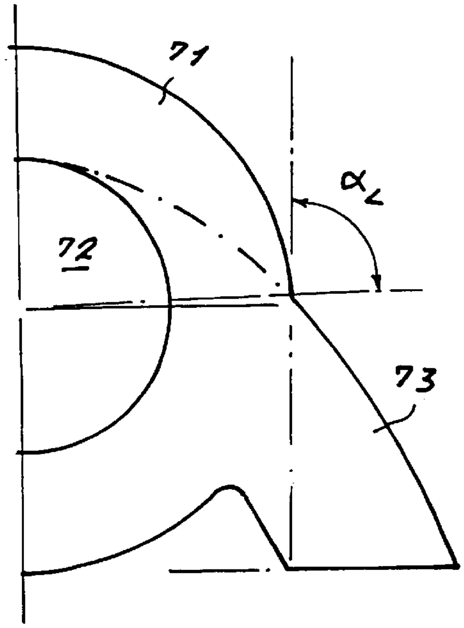
Figure 16:
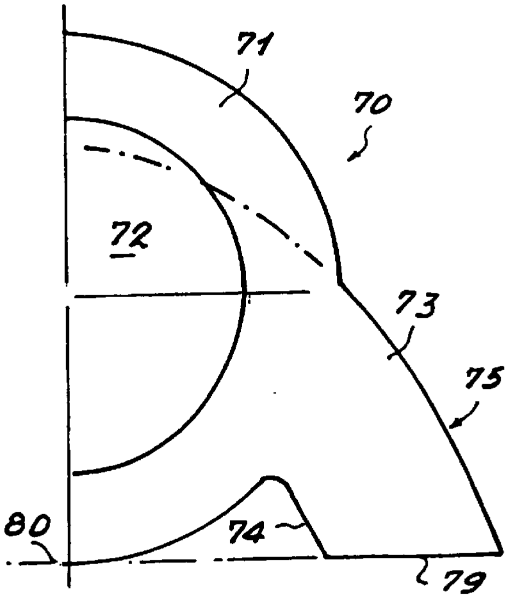

FIGS. 14 to 16 are cross sectional views of alternative versions of the first embodiment with lugs.

Figure 17:
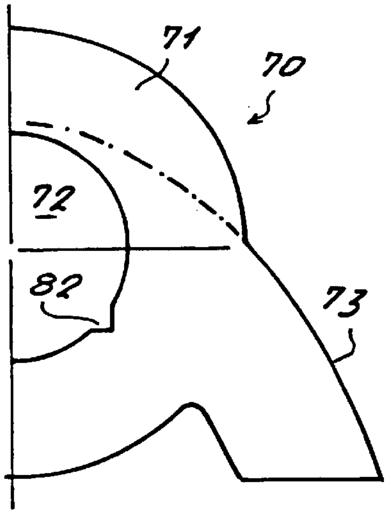

FIG. 17 illustrates another alternative version of the first embodiment with lugs and longitudinal recesses on the internal face of the bore.

Figure 18:
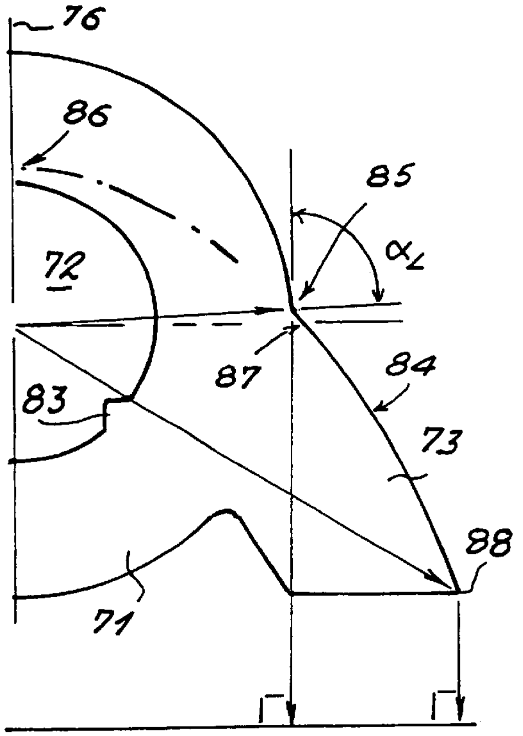
Figure 18A:
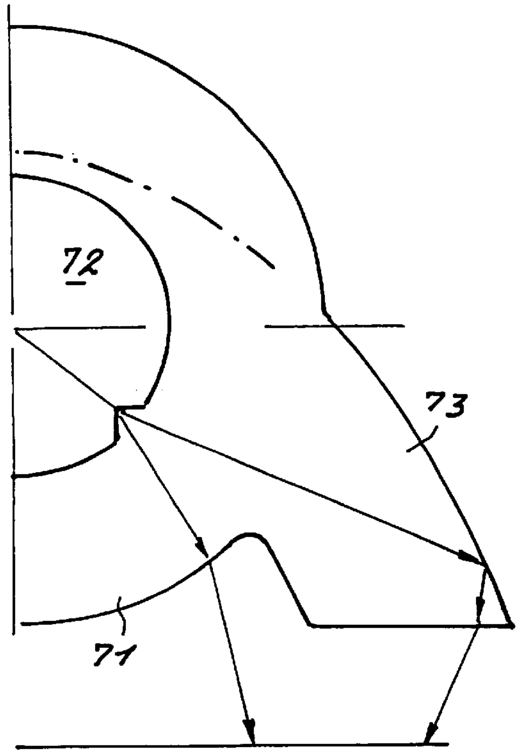
Figure 18B:
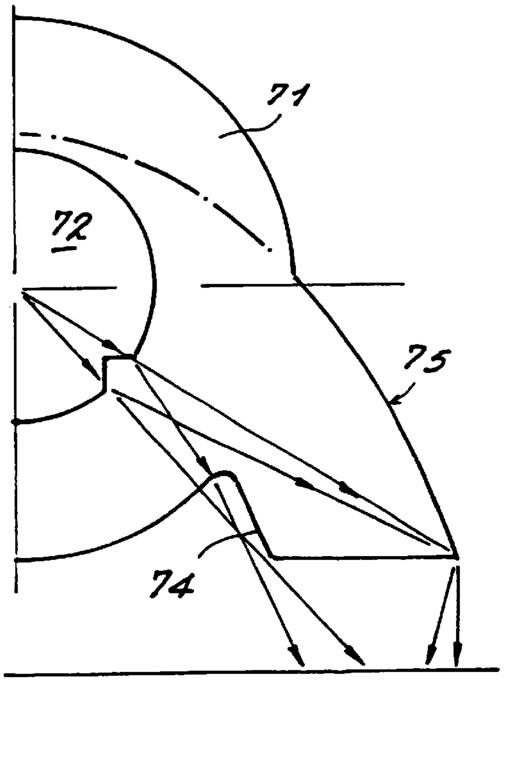

FIGS. 18, 18A and 18B illustrate another alternative version of the first embodiment with lugs and longitudinal spurs on the internal face of the bore.

Figure 19:
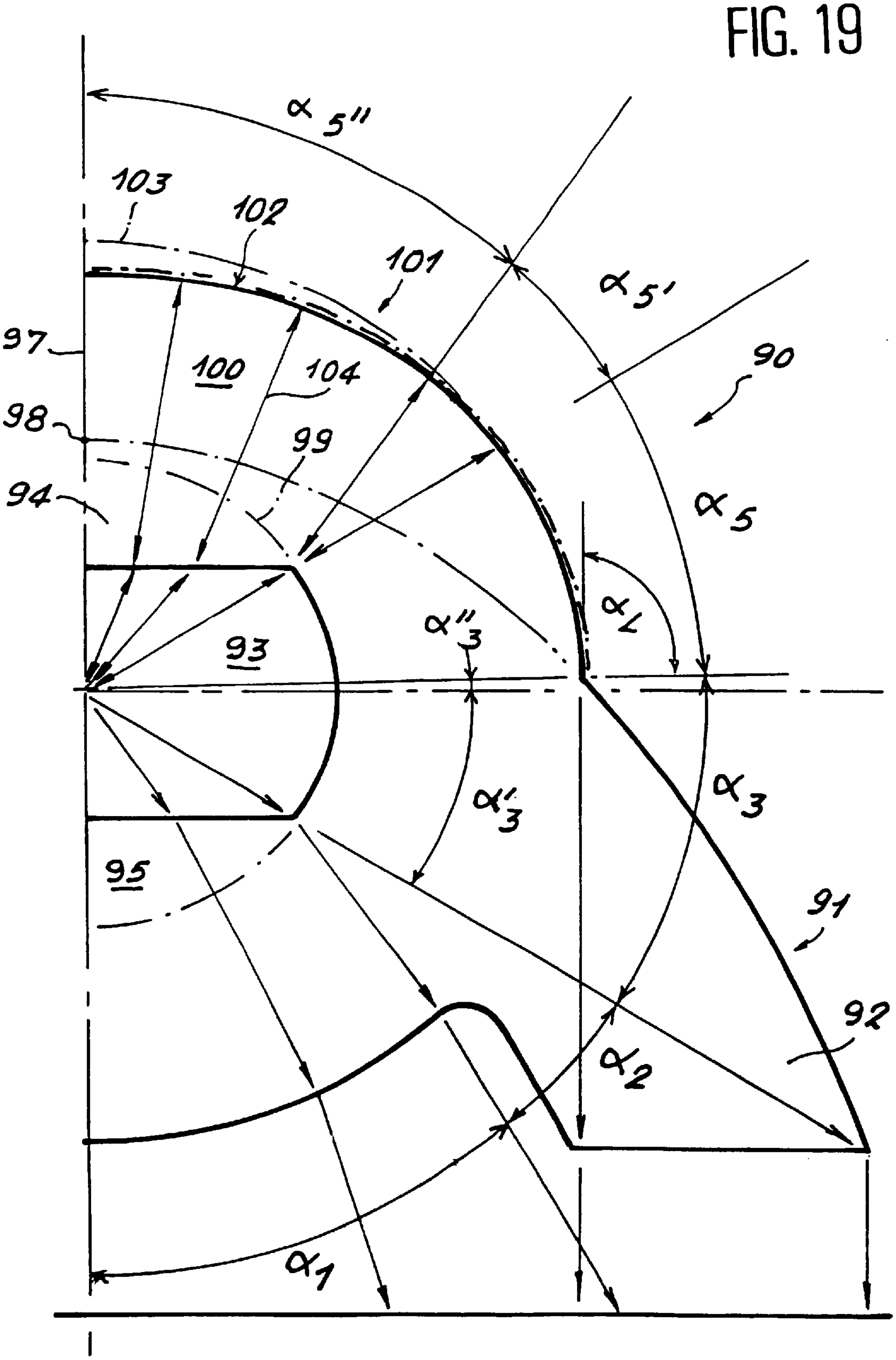

FIG. 19 illustrates another alternative version of the first embodiment with a bore of appreciably rectangular cross section, and the upper face of the dome in the form of a flattened cylinder.

Figure 19A:
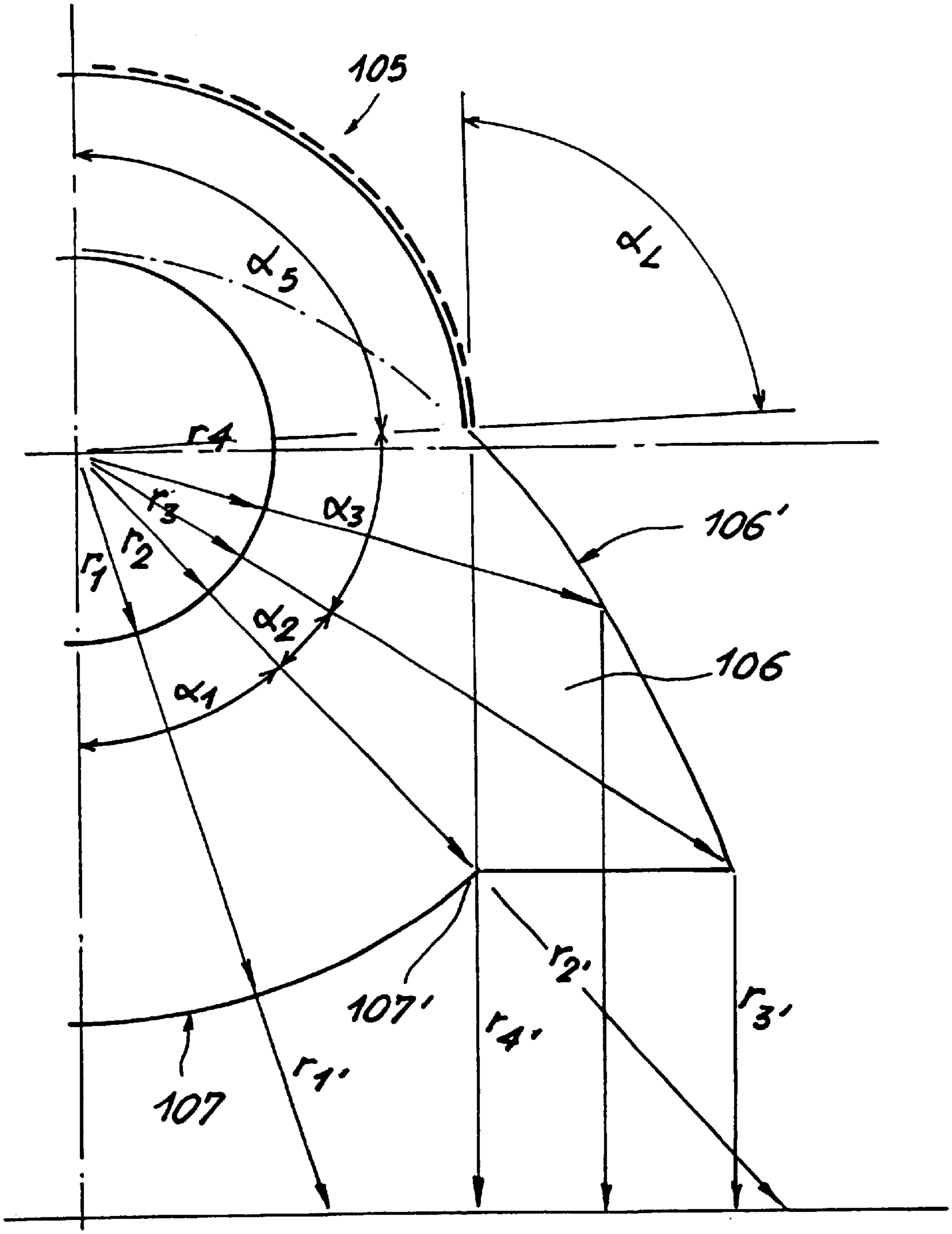

FIG. 19A shows another alternative version with lugs and rounded base.

Figure 19B:
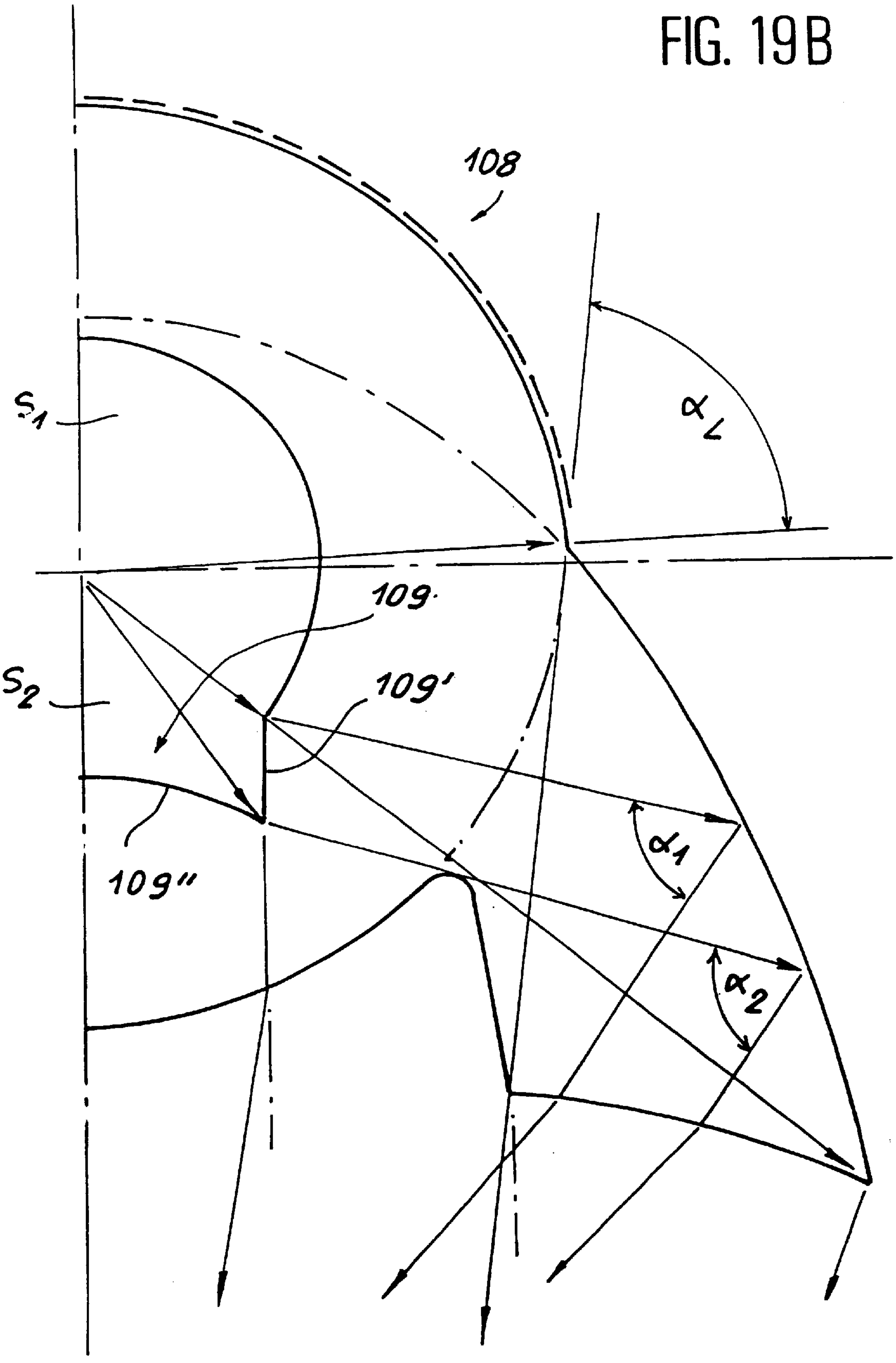
Figure 20:
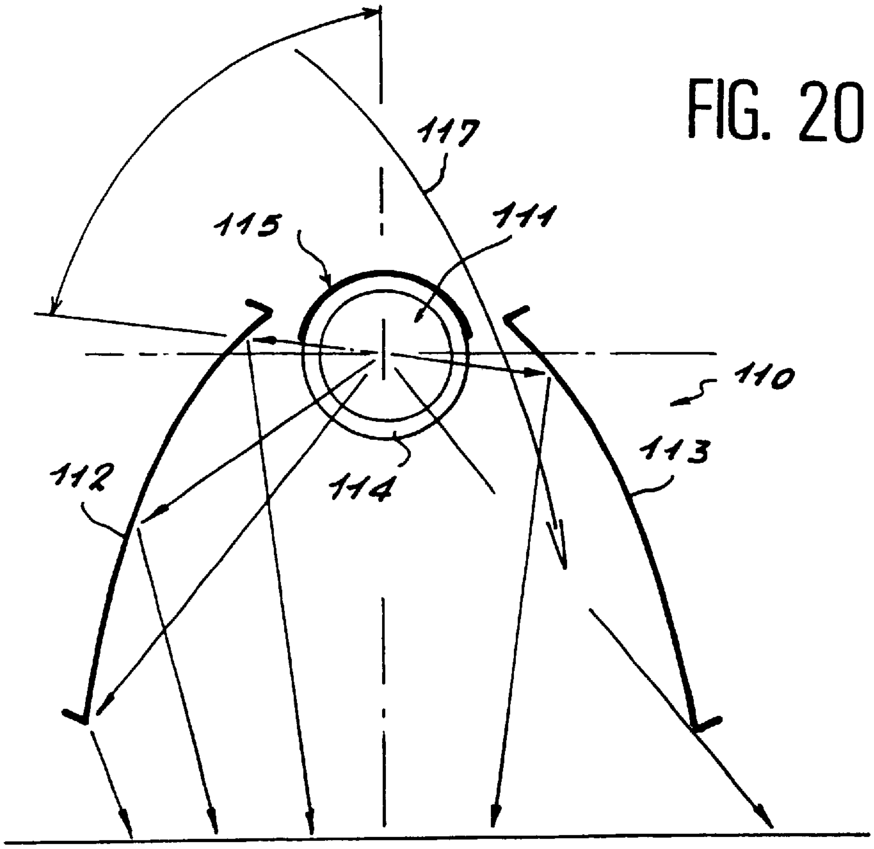
Figure 21:
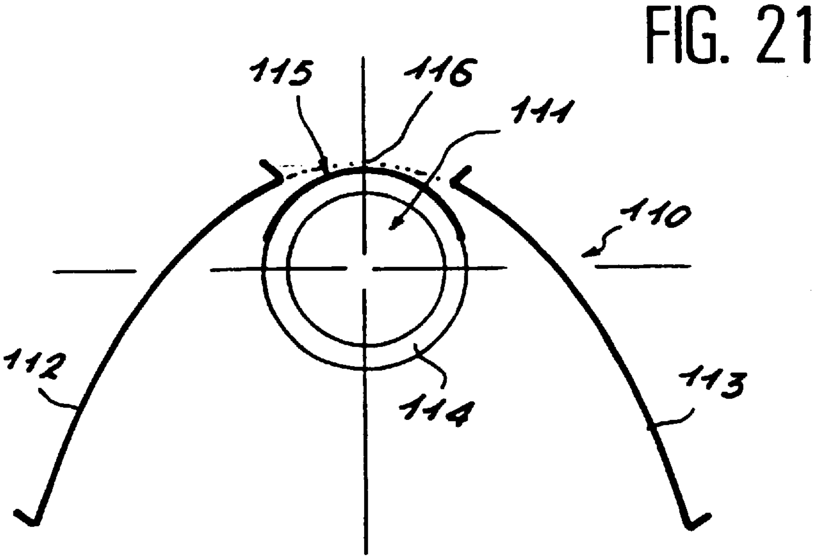
Figure 22:
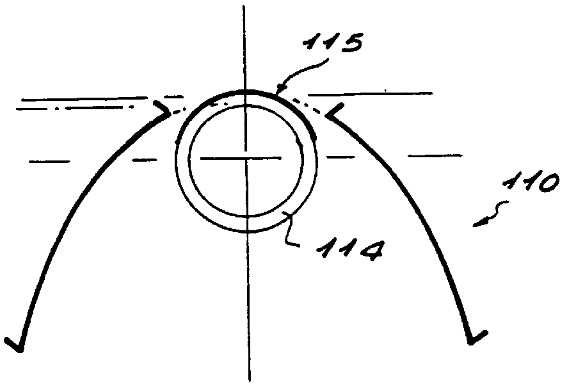
Figure 23:
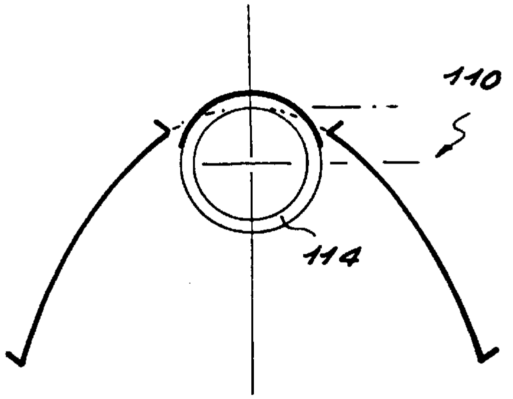
Figure 24:
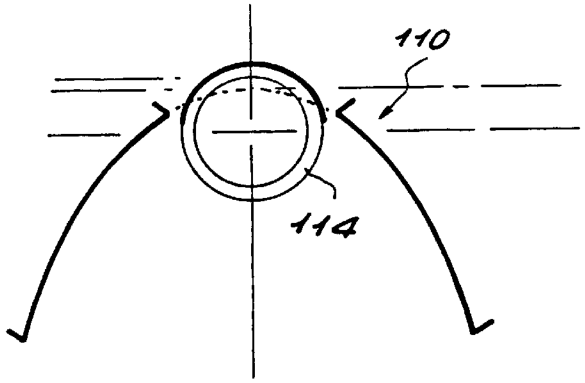

FIG. 19B shows another alternative version with lug and recess in the internal wall of the bore.

FIGS. 20 to 24 are cross sectional views of alternative versions of a third embodiment of a transmitter/reflector according to the invention with side wings entirely at a distance from the transmitter tube and comprising a reflecting surface of elliptic (FIG. 20) or parabolic (FIGS. 21 to 24) cross section.

Figure 25:
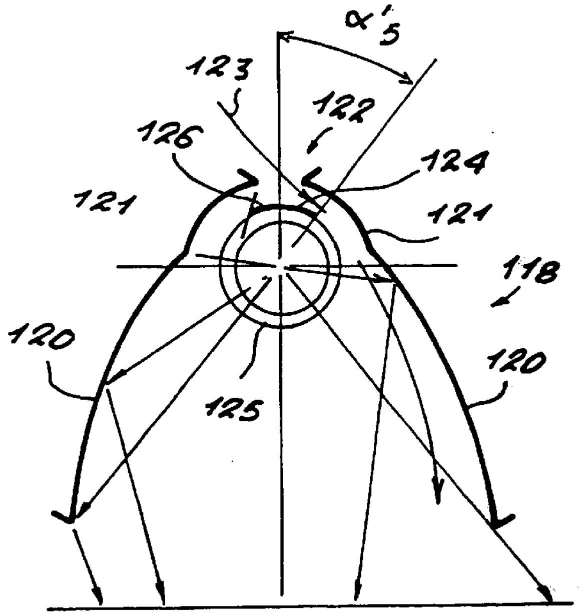

FIG. 25 is a cross sectional view of a fourth embodiment of a transmitter/reflector according to the invention with side wings entirely at a distance from the transmitter tube and comprising a reflecting surface of elliptic cross section.

Figure 26A:
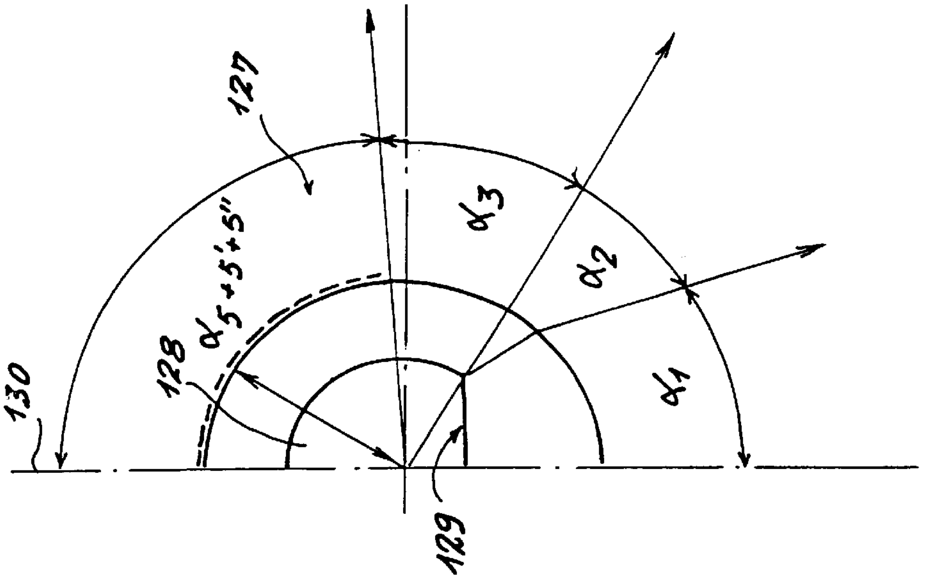
Figure 26B:
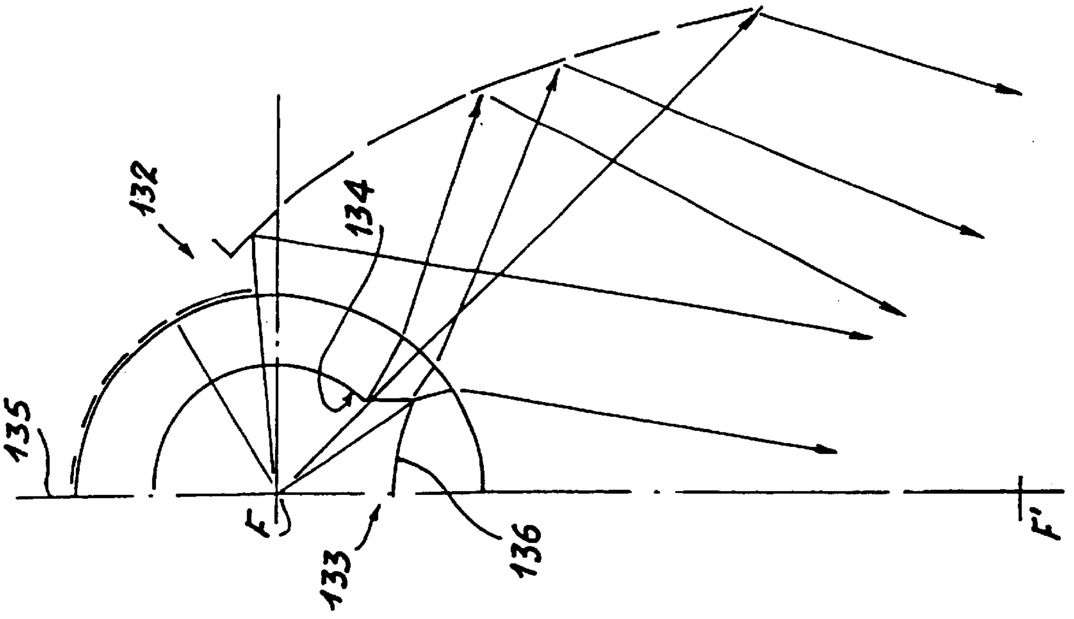

FIGS. 26A and 26B are cross sectional views of a fifth embodiment with a reflector in three parts, situated entirely at a distance from the cylindrical transmitter comprising a truncated bore or a bore with a recess.

Figure 27A:
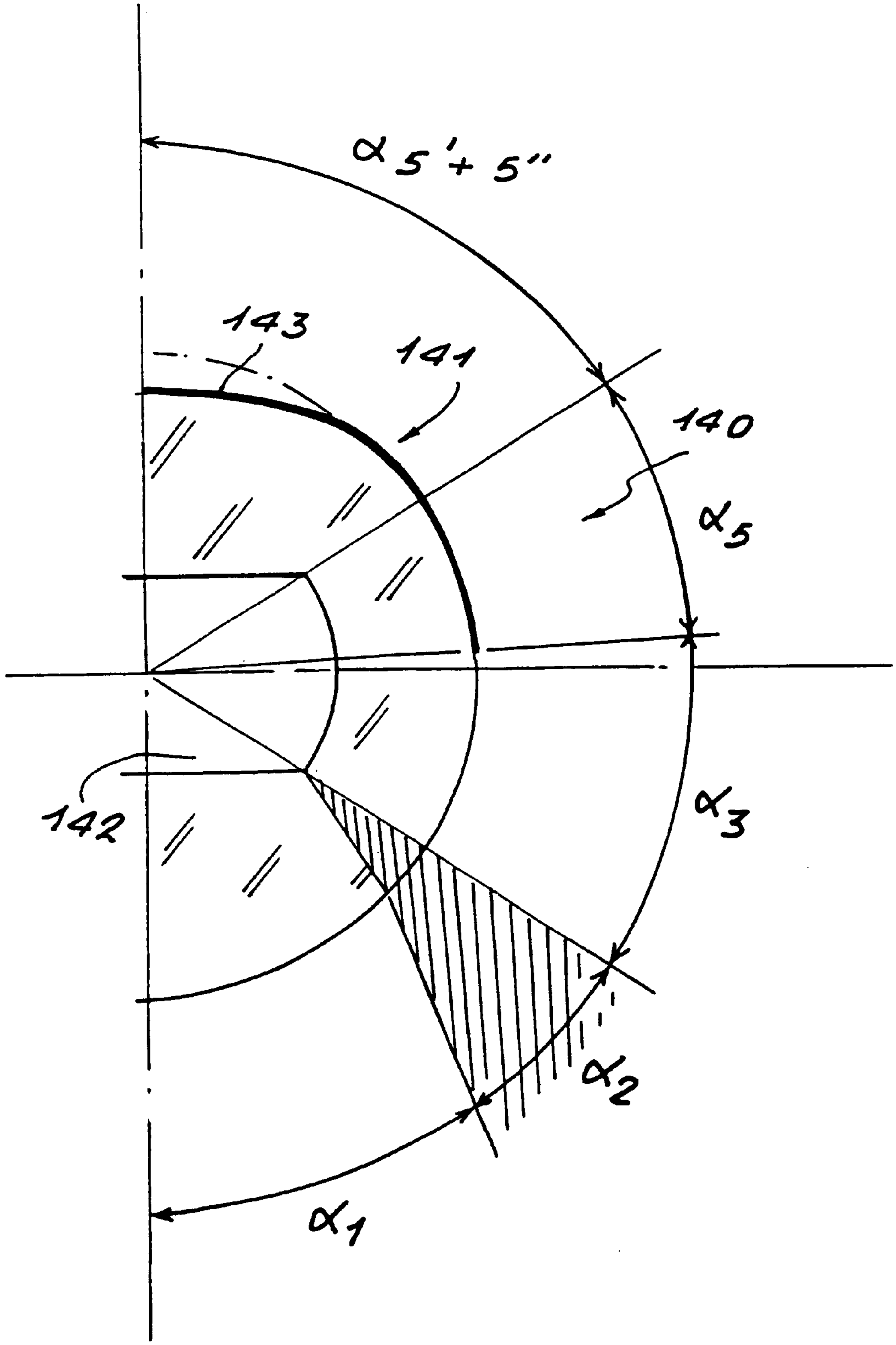
Figure 27:
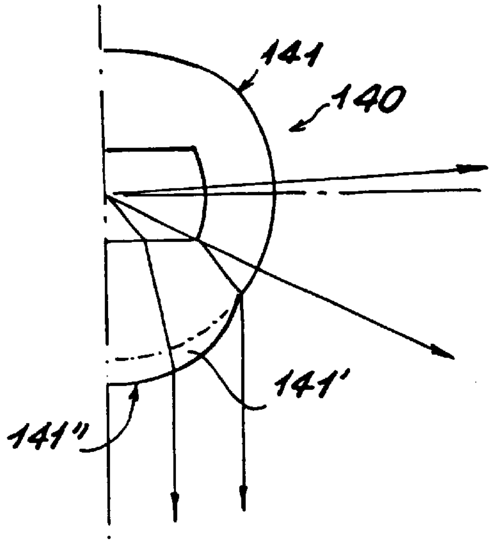

FIGS. 27A, 27A', 27B, 27C and 27D show in partial cross section a sixth embodiment of a device according to the invention, with a truncated bore.

FIG. 28 is a longitudinal cross sectional view of an embodiment of an electrode chamber of a transmitter tube of the type described with reference to FIG. 10.

FIG. 29 is a cross sectional view of an embodiment of an electrode chamber of a transmitter tube according to FIG. 27A.

FIG. 30 illustrates a longitudinal cross sectional view of an alternative version of FIG. 28, with no electrode.

FIGS. 31 and 31A are cross sectional views, respectively longitudinal and transverse, of another embodiment of an electrode end of a transmitter tube according to the invention.

Figure 32:
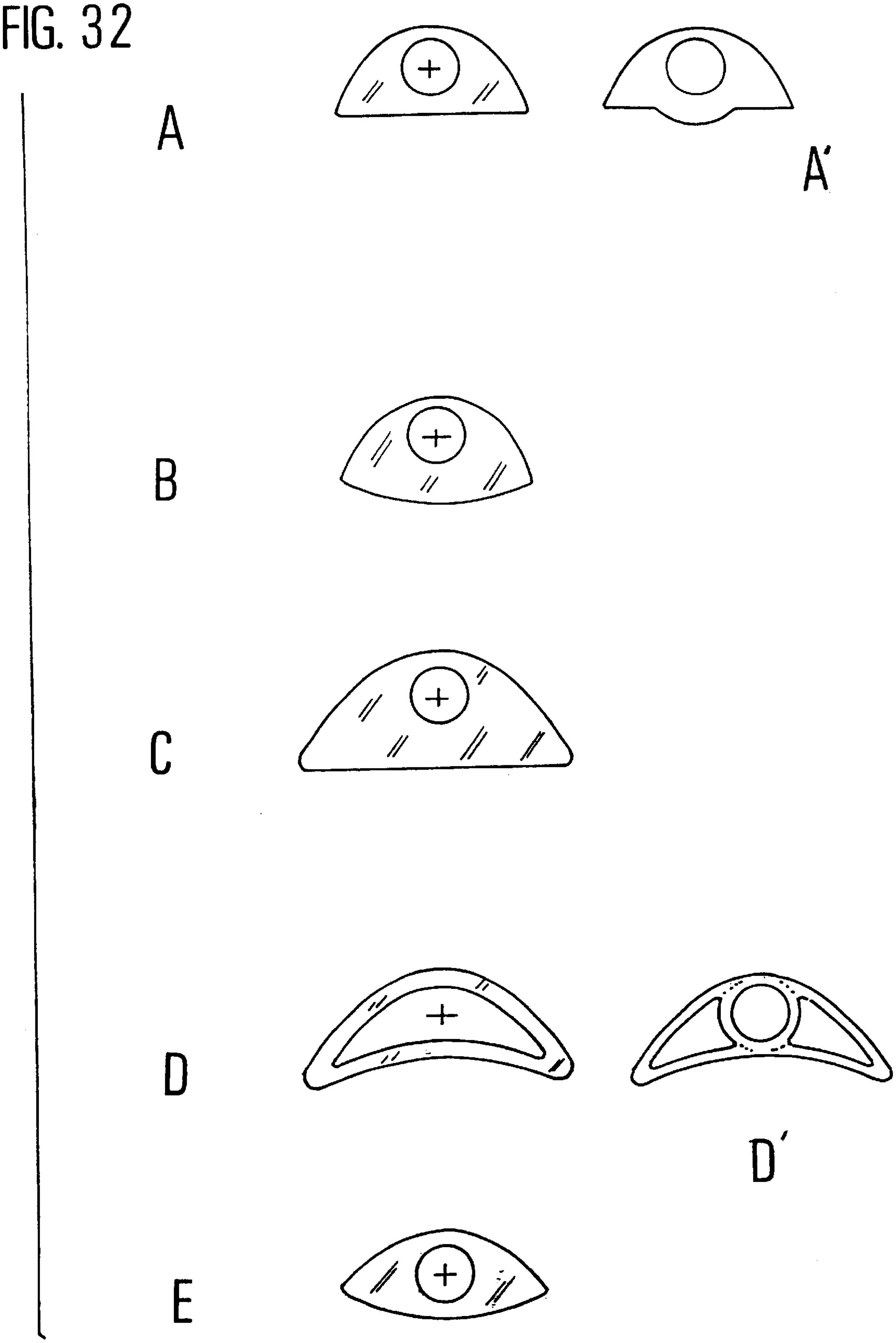

FIG. 32 schematically shows transverse cross sections (A, A', B, C, D, D' and E) of a transmitter/reflector according to various embodiments of the invention.

Figure 33:
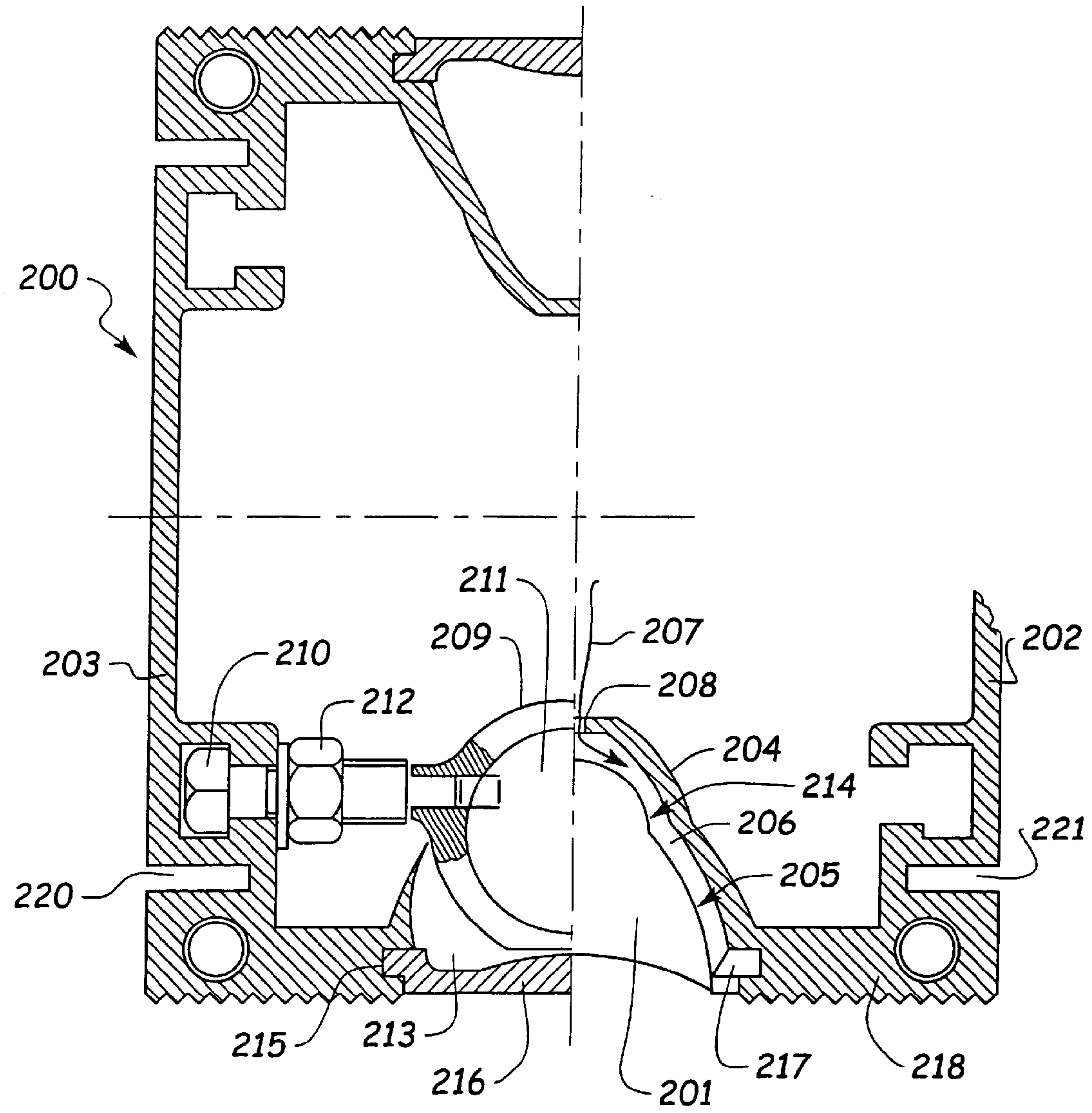

FIG. 33 is a partial cross sectional view of a first embodiment of an apparatus comprising a transmitter/reflector according to the invention.

Figure 34:
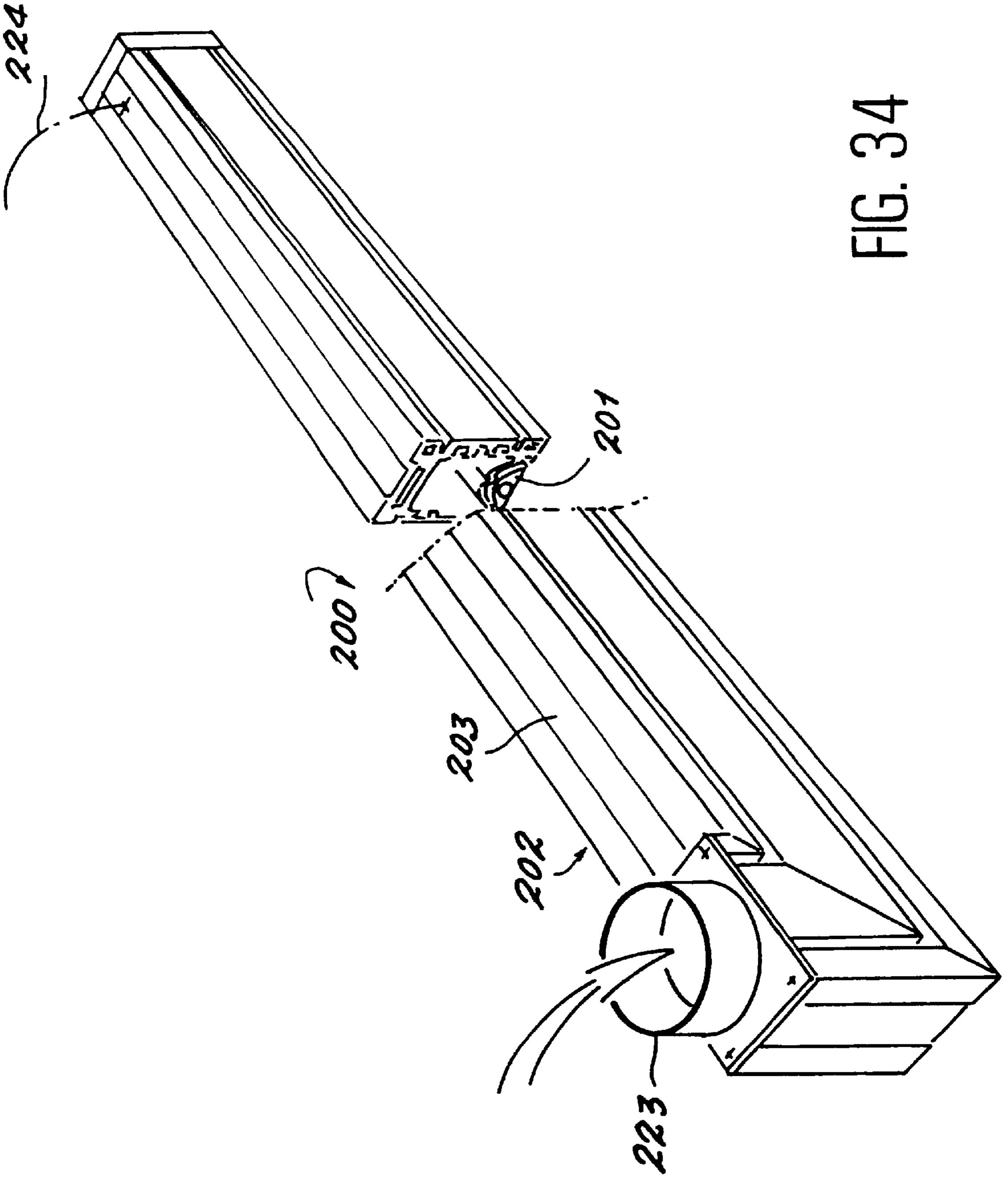

FIG. 34 is a partially exploded perspective view of a second embodiment of an apparatus according to the invention.

Figure 35:
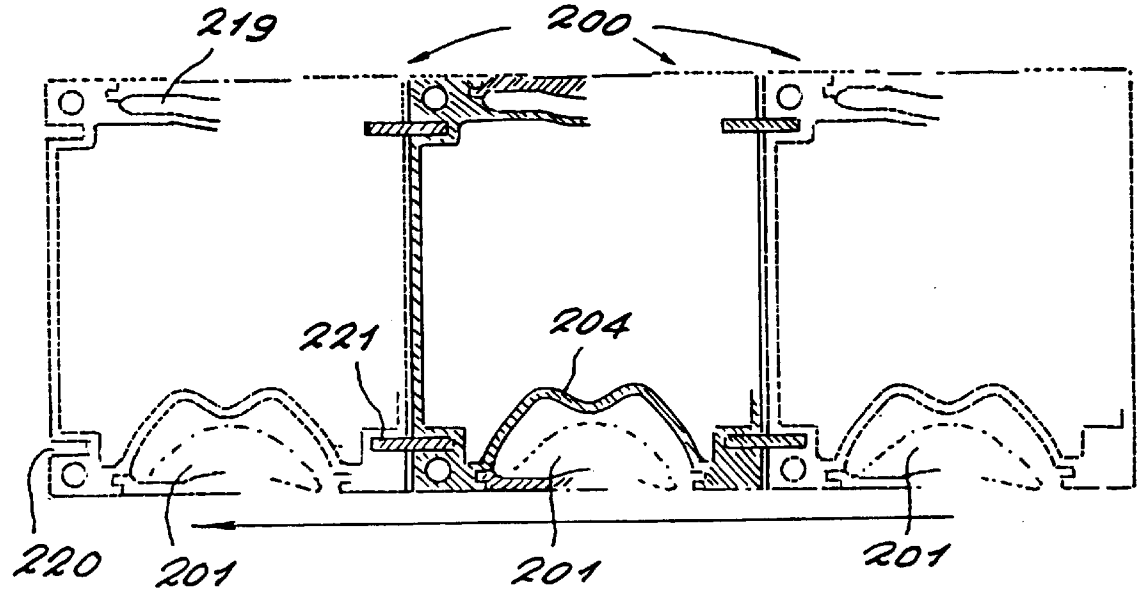

FIG. 35 is a cross sectional view of a third embodiment of an apparatus according to the invention comprising several devices arranged parallel to one another.

Figure 36:
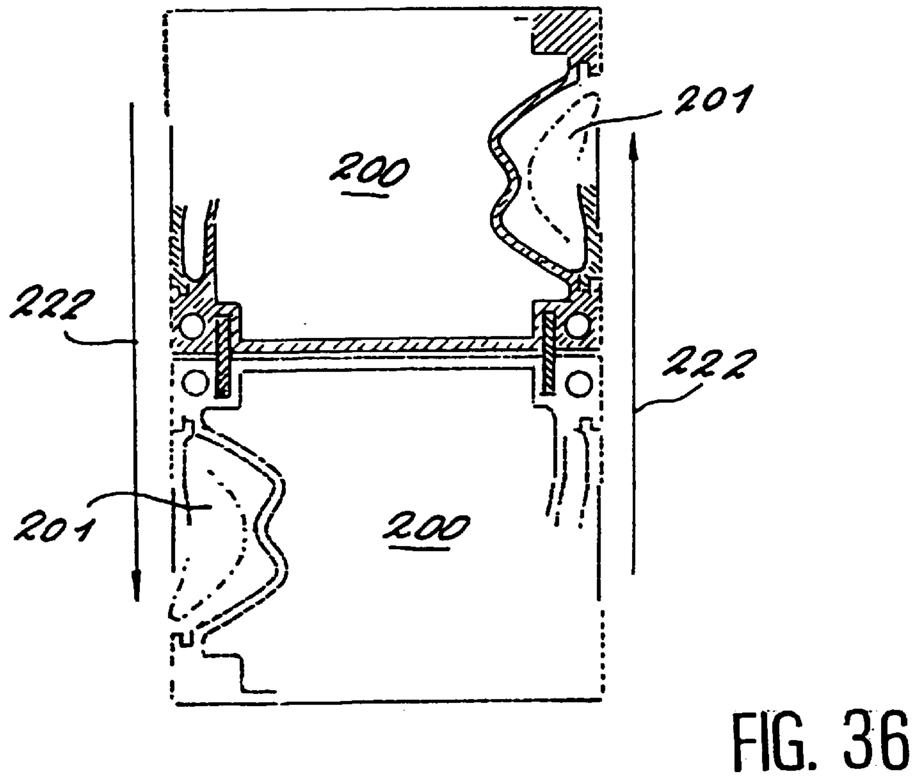

FIG. 36 is a cross sectional view of a fourth embodiment of an apparatus according to the invention comprising two devices arranged in opposition.

Figure 37:
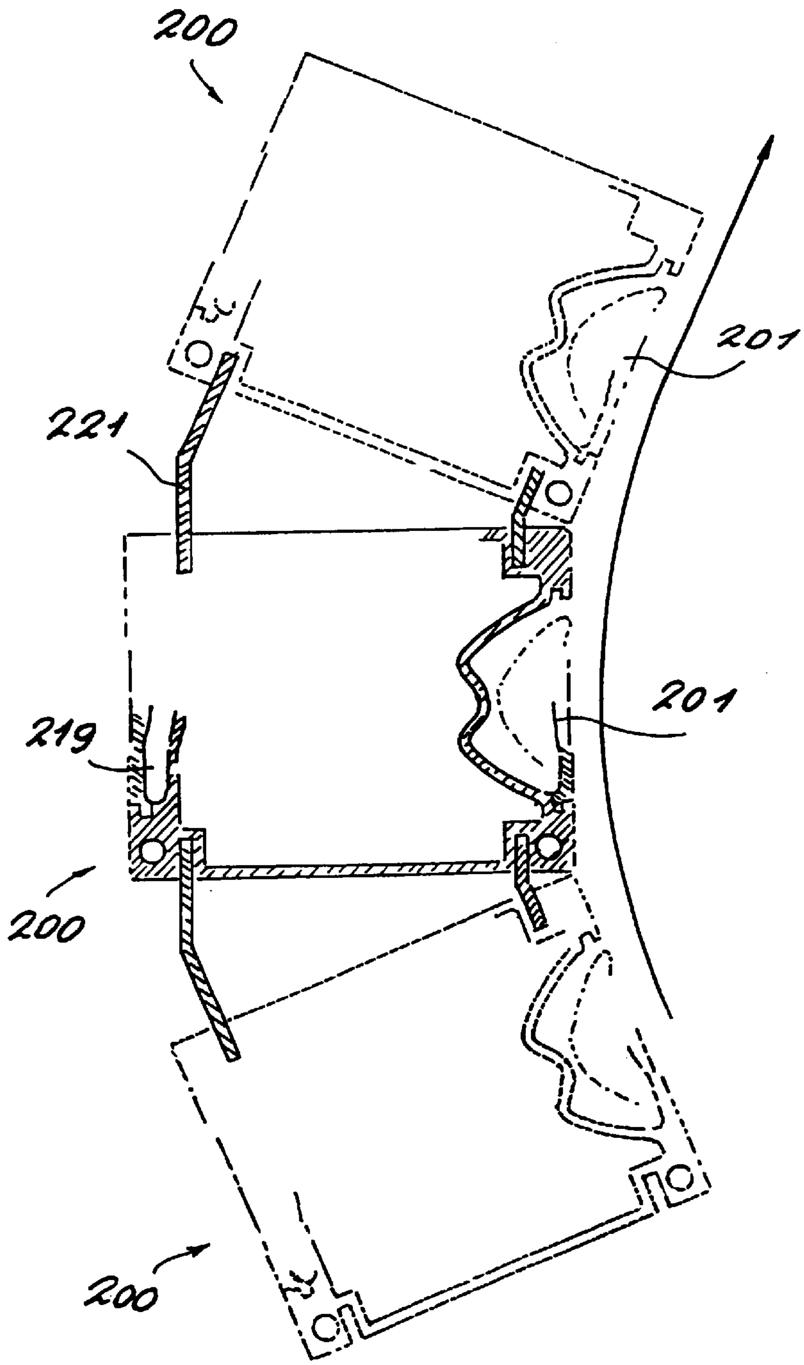

FIG. 37 is a cross sectional view of a fifth embodiment of an apparatus according to the invention comprising several devices arranged angularly.

Figure 38A:
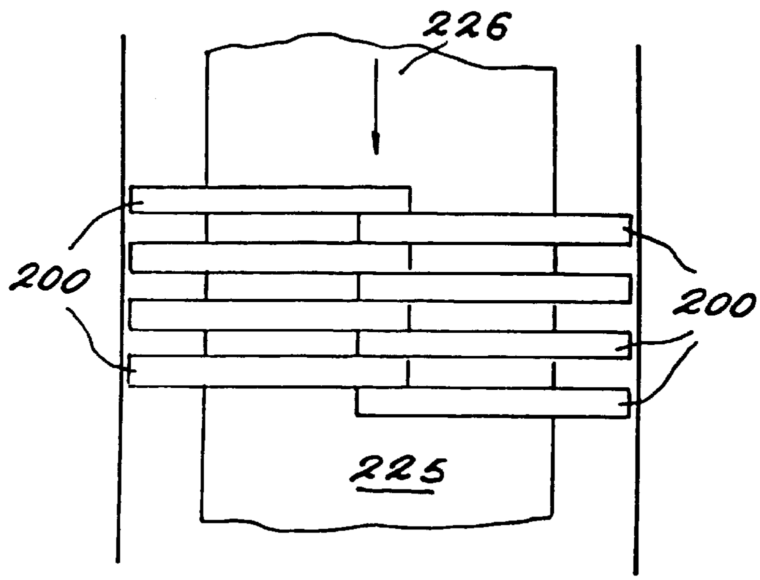

FIGS. 38A, B and C are schematic top views of apparatuses according to three embodiments of the invention enabling the processing of plated products to be optimized.

Figure 39:
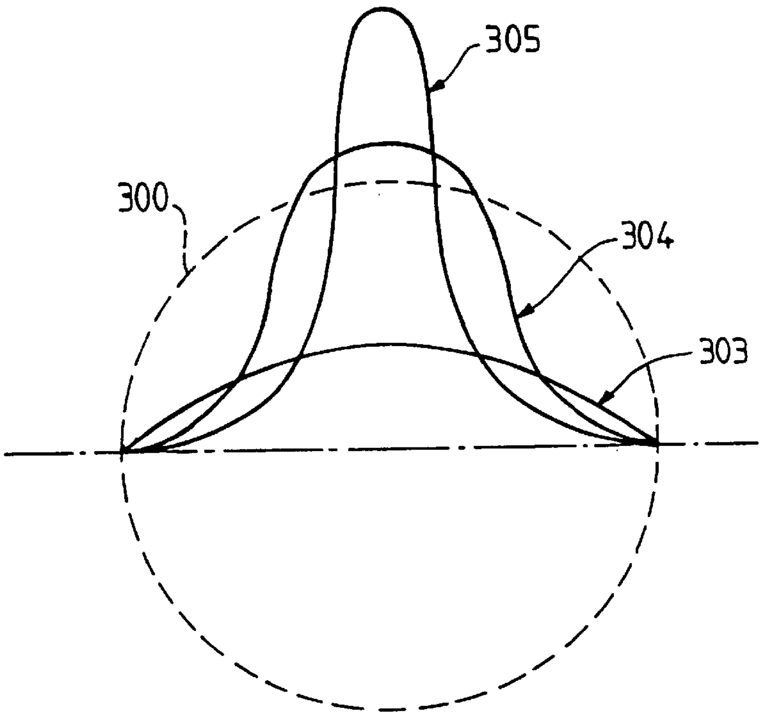

FIG. 39 is a schematic view showing the distribution of the radiation density in a tube according to an embodiment of the invention, according to three types of linear voltage: 10 Volts/cm, 30 Volts/cm and 100 Volts/cm.

Figure 40B:
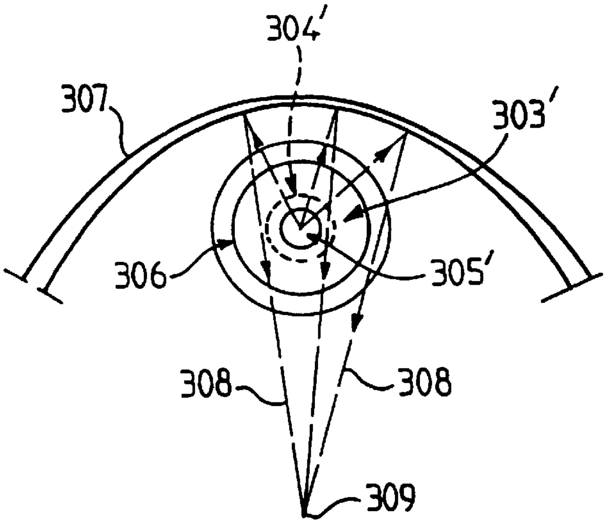
Figure 40A:
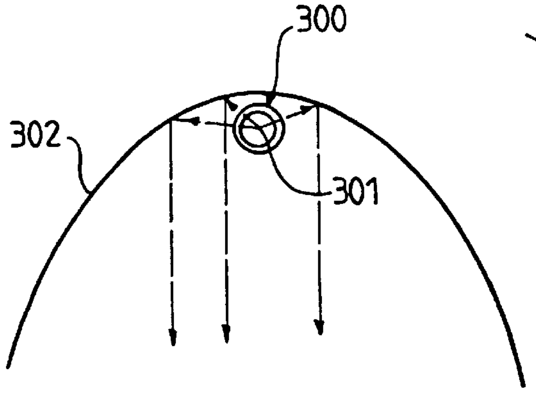

FIG. 40A shows a device according to another embodiment of the invention, with a parabolic reflecting wall, a tube of small diameter and a cylindrical plasma beam away from the walls of the tube.

FIG. 40B shows another embodiment with a cylindrical tube of small diameter, showing three sections of plasma beam under three different voltages.

Figure 41:
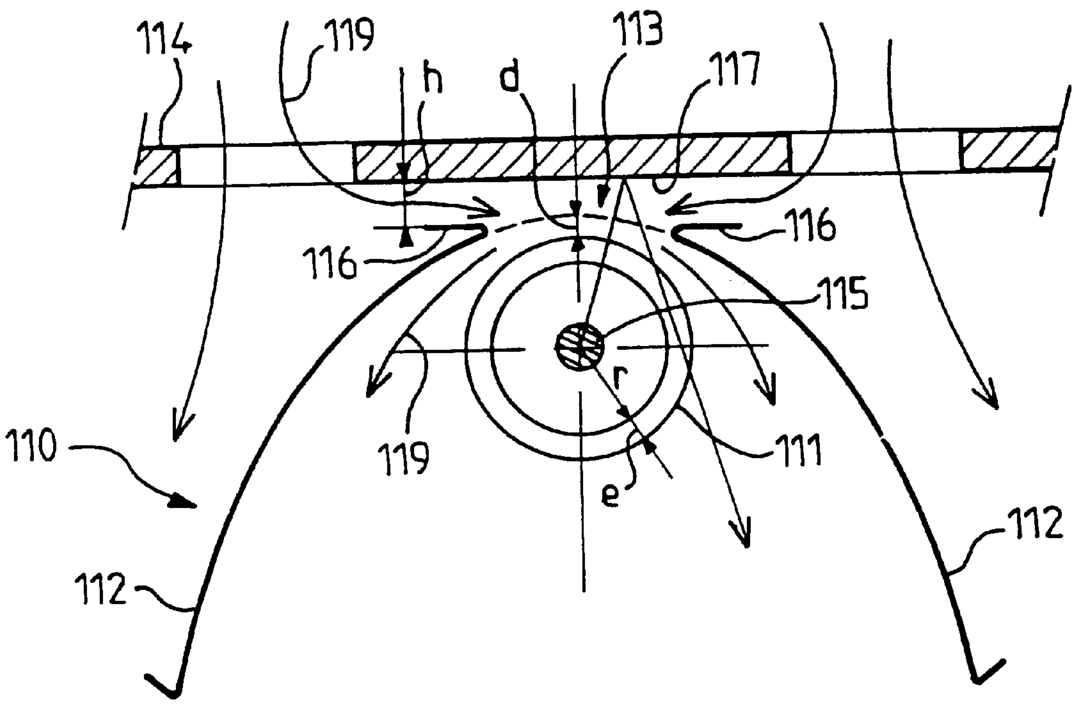

FIG. 41 shows a device implementing the process according to an embodiment of the invention with a plasma beam of small diameter in relation to that of the internal bore.

DETAILED DESCRIPTION OF THE PREFERRED EMBODIMENTS

In the description which follows, the same reference numbers will preferably be used to designate elements which are identical or of the same type.

FIGS. 1 to 4 show a device 1 in cross section comprising a straight glass tube 2, for example made of extruded quartz.

The tube 2 is drilled from end to end by a cylindrical bore 3, of axis 4 and of radius r, obtained by extrusion.

It is closed at each end by electrode-bearing plugs (not represented) which will be described in detail further on, and contains an ionising gas, for example a mercury iodide, at medium pressure, for example 3 bars, able to transmit ultraviolet radiation 5, when the tube is powered and it creates a plasma arc between the electrodes, in a manner known in itself.

The tube 2 comprises a wall 6 provided with an external surface of at least partly parabolic section, of equation $y=x^2/4f$, f being the focal distance of the parabola between the focal point 8 which merges with the axis 4 of the bore and the generating line at the peak 9 of the parabola, situated in the axial plane of symmetry 10 of the bore.

Figure 1:
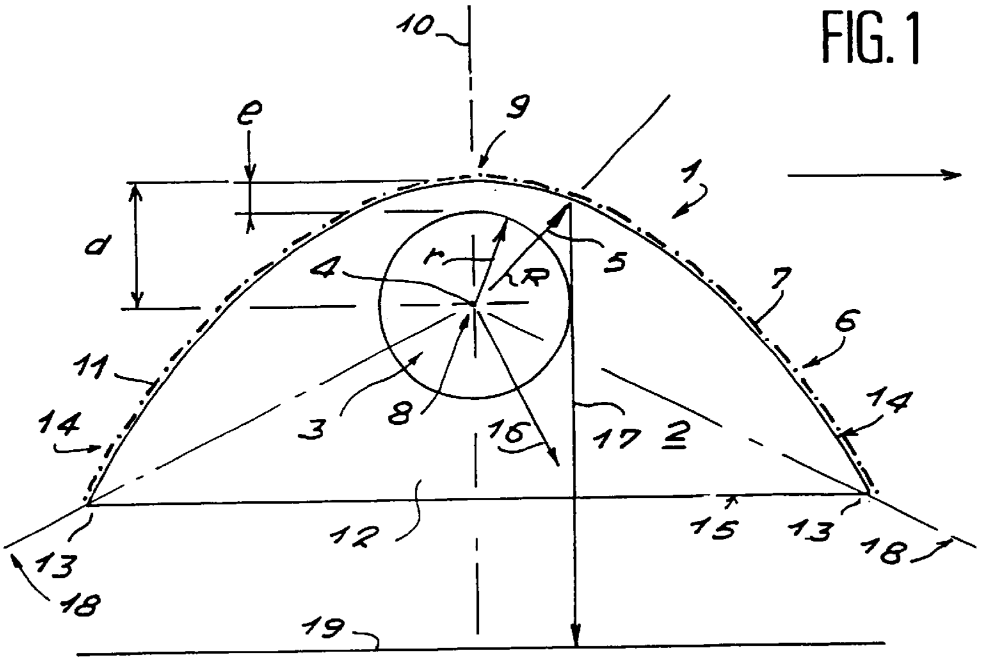

The thickness of the tube in the axial plane 10, from the wall situated on the same side as the generating line to the peak 9, being e and d being the distance between the axis 4 of the bore and the generating line to the peak 9, it follows that:

$d=f$ and, $d=r+e$ (FIG. 1)

Figure 2:
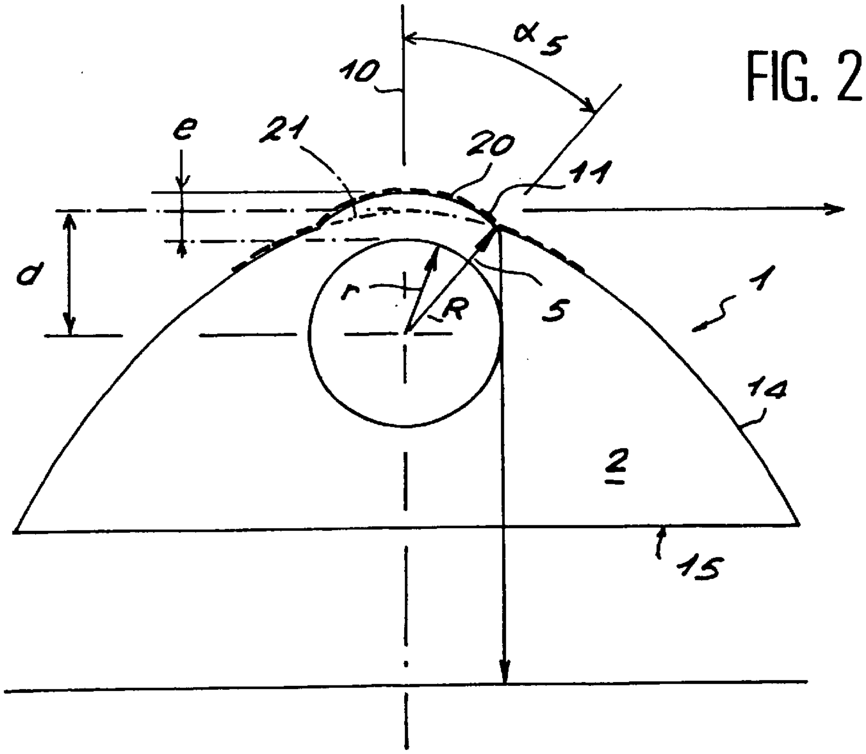

$d<r+e$ (FIG. 2)

Figure 3:
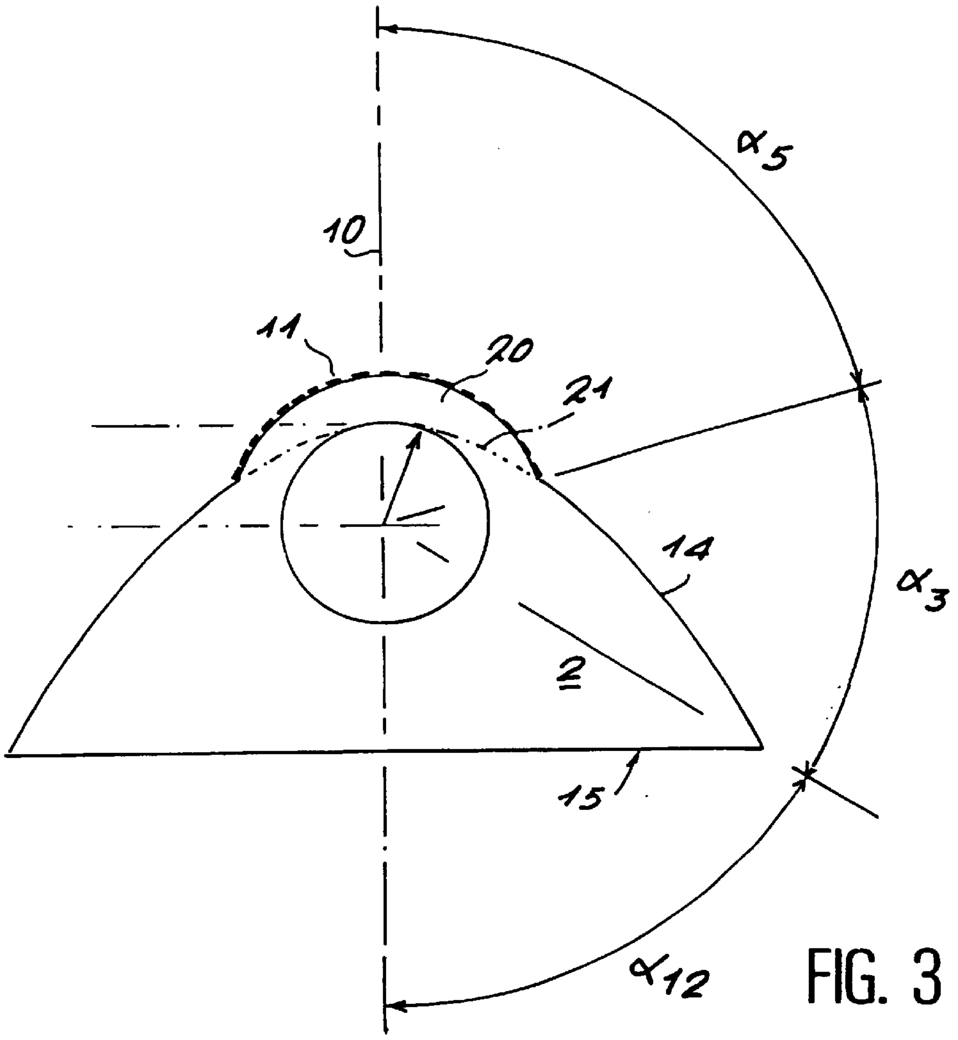

$d=r$ (FIG. 3)

Figure 4:
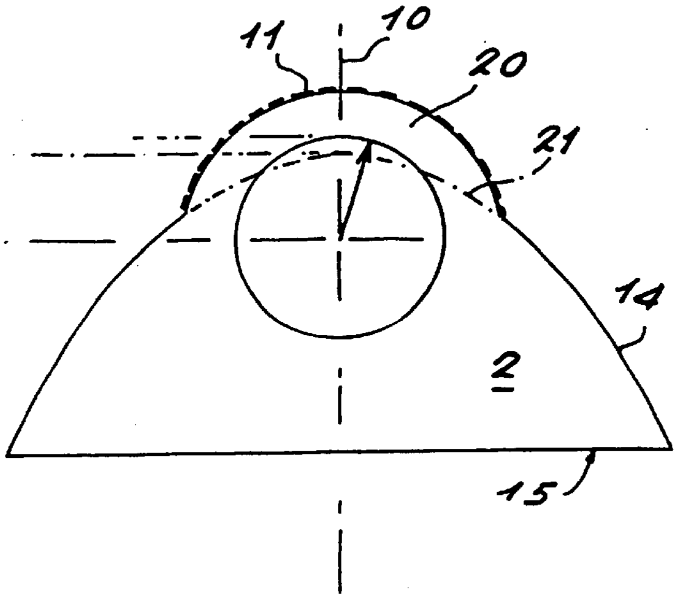

$d<r$ (FIG. 4).

According to the embodiment of the invention of FIG. 1, the surface 7 is entirely parabolic. It is covered, for example by cathode sputtering in a vacuum or any other means known to the man of the trade enabling adhesion on quartz of a film 11 (in broken line in FIG. 1) of material reflecting the ultraviolet rays (U.V.) transmitted, for example of a metal layer of aluminium of a thickness of about one micron, for U.V. of wavelength from 100 nm to 1 micron, for example 360 nm.

The tube 2 is closed on the other side of the peak 9 in relation to the bore 3 by a solid wall 12 extending between the ends 13 of the side wings 14 formed by the sections of parabola symmetrical in relation to the axial plane 10.

The wall 12 comprises an external face 15, transparent to radiation, for passage of the directly transmitted rays 16 or of the rays 17 reflected by the parabola.

It is recalled here, as a reminder:

that the radiating energy (total or almost total) which irradiates from the focal point 8 of the parabolic curve, or as will be seen hereafter elliptic curve, or combined "arc of circle and parabola" or combined "arc of circle and ellipse", is formed by the sum of two radiating energies: the primary radiating energy, which irradiates directly in a closed conical space 18 (in mixed line in FIG. 1) and whose limits are the ends 13 of the side wings of the reflector, and the secondary radiating energy, which irradiates directly in a conical space open on the reflection curve of the reflector to be reflected therein and return at best perpendicular (arrow 17) to the product situated in the irradiated plane 19 (case of the parabola) or perpendicular to the tangents to the curved product to be treated by irradiation (see hereafter the case of the ellipse), that the energy efficiency of an ultraviolet ray depends on the distance it covers from its point of transmission to its point of receipt; by shortening this distance from the point of transmission to the reflection plane (parabolic or elliptic curve) on the one hand, and from the reflection plane to the irradiated product on the other hand, the invention therefore optimises the efficiency, that the sources whose luminance is independent from the direction obey Lambert's law, that a better penetration depends on a high power density.

The intensity radiated in any direction is then equal to the product of the intensity radiated in the direction of the normal to the radiated surface by the cosine of the angle which this direction makes with the normal.

The face 15 of FIGS. 1 to 4 is therefore flat and perpendicular to the axial plane 10. In the embodiments more particularly described here, the transmitter/reflector device is a monoblock entity, made of extruded quartz glass material, of very high transparency quality in the 180 nm to 2000 nm passband and with a very low fluorescence level, in which the transmitter and its reflector are intimately linked, joined and inseparable, in such a way that the convex part, whose shape is parabolic or elliptic, or presents another combined mathematical shape related therewith, such as arc of circle+parabola or arc of circle+ellipse, is achieved to become the reflecting surface.

The other part, facing the irradiated product, is transparent and arranged to direct the whole of the transmitted radiation to the product, in such a way that the whole or the essential part of the primary and secondary radiation arrives with parallel or appreciably parallel fluxes perpendicularly to the irradiated product, according to Lambert's law, in the case of a parabola, or in the direction of the axial plane 10 towards the second focal point of the ellipse in the case of an ellipse.

The geometrical shape of the dioptric surfaces, and in particular that of the lower portion of the bore, implemented and generated structurally within the scope of the embodiments of the invention more particularly described here, is designed with reference to the geometrical focal point of the device comprising the tubes according to the invention, a focal point in general merging with the axis of the bore, which will therefore hereinafter be called focal axis.

Thus any light point originating from the focal axis irradiates radially as subsequently represented in the figures.

On the other hand, it can be noted that any light point of the beam situated outside the focal axis only partially complies with this radial irradiation mode corresponding to the design of the dioptric surfaces. Only the radiation originating in the plane passing through the focal axis corresponds to this design.

In the case of FIG. 1, the radius of curvature P of the straight transmitter is therefore also the radius of curvature of the peak of the parabolic curve.

We therefore have R=r+e', r being, as we have already seen, the radius of the cylindrical bore 3, which defines the light disk of the ultraviolet transmitter, and e' the thickness of the quartz glass wall 11 of this same transmitter varying between e and the maximum thickness of the wall in the corresponding axial plane.

In other words, the radius of curvature of the transmitter and that of the peak of the reflector are identical and merged into one and the same.

According to the invention, they are moreover and advantageously of small size, i.e. ≦15 mm, advantageously ≦10 mm, or even ≦5 mm, even ≦2 mm, for example=1.5 mm.

Referring to FIGS. 2, 3 and 4, the radius of curvature R can also be the external radius of the arc of circle of a dome 20 in the form of a portion of cylinder symmetrical in relation to the axial plane 10 and of identical axis to the axis 4 of the bore 3.The dome according to the invention is still covered on its external surface with a reflecting material 11 (in unbroken line in the figures), for example aluminium. As will be seen the rest of the external faces 14 of the parabolic wings may be either also covered with a reflecting material, or be deprived thereof beyond a certain angle of centre $\alpha_5$ corresponding to an angle of limit incidence $\alpha_L$, in which case reflection of the rays transmitted by the tube will take place by dioptric refraction, according to a particularly advantageous embodiment of the invention.

The arc at the peak of the parabolic curves is for its part represented in an unbroken line 21 (virtual state) in FIGS. 2 to 4.

Figure 5:
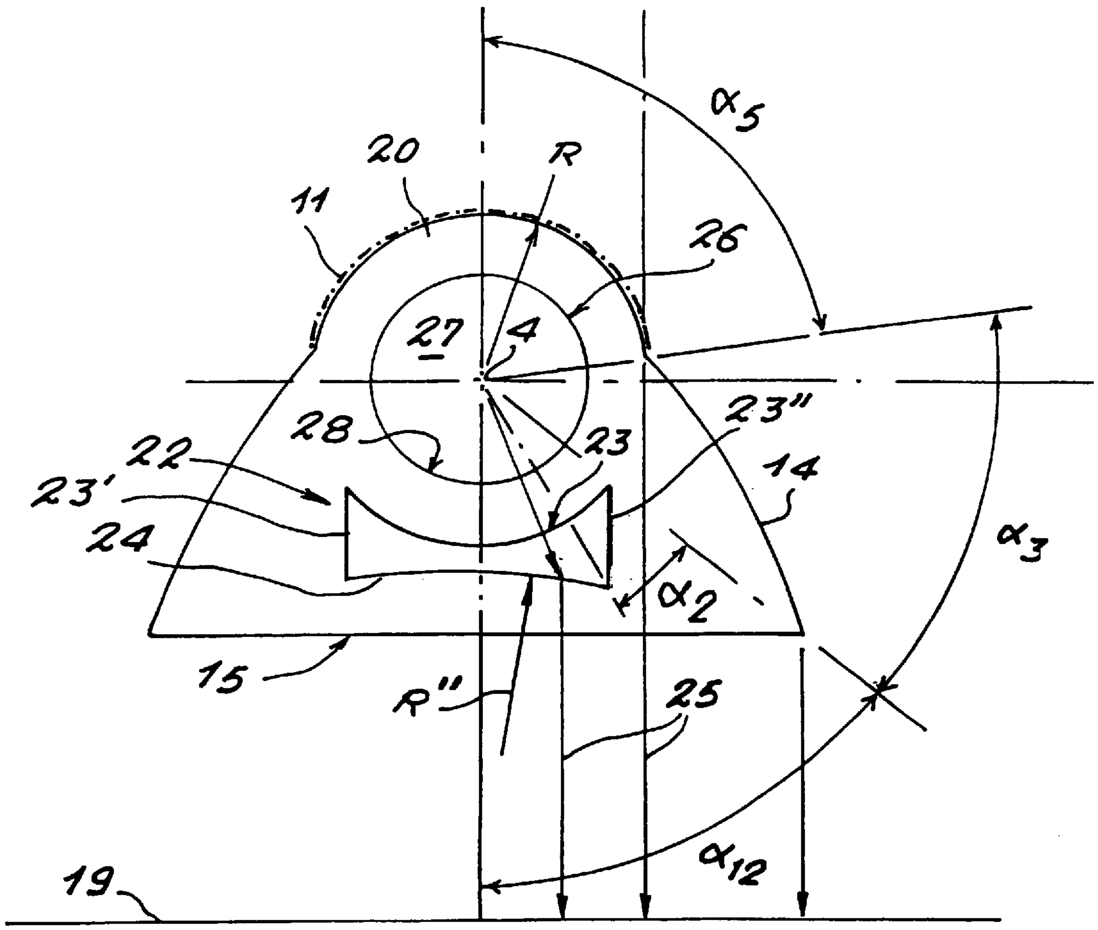

In FIG. 5, another embodiment of the invention has been represented comprising a dioptric cavity 22 formed by a longitudinal slit comprising a concave upper face 23 in the form of a cylindrical portion, of axis 4 and of external radius equal to r+e.

The cavity 22 comprises two side faces 23' and 23" parallel to the axial plane 10 and inscribed in the angle $\alpha_2$ defining the dihedron in which the rays would be entirely reflected by the dioptric wall 15 in the absence of cavity.

The cavity also comprises a lower face 24 in the form of a curve whose equation is determined according to the laws of optics to obtain a beam of rays 25, transmitted to the support and conveying plane 19 of the products to be dried, which is as parallel as possible.

In this particular case, the curve is a portion of cylinder of radius R'≈R, with R=r+e.

In case of absence of a partial cylindrical dome (FIG. 1) or if the arc at the peak of the latter is less than $2\times\alpha_5$ the rays inscribed in the angle ax are totally or at least partially reflected on the parabolic curve (this will also be valid in the case of an elliptic curve as will be seen hereafter) and pass again inside the light disk, defining an angle with the circular diopter 26 (FIG. 5) which is variable according to their position.

They are then refracted in the surface of the luminous disk 27 elsewhere than on the transmission focal point, then pass through the circular diopter 28 again in the other direction according to variable angles of incidence and refraction, distributing the radiation in different directions from those normally reflected by the parabolic (or later elliptic) curve.

It is therefore to minimise the dispersion of this radiation that the invention proposes to replace the parabolic or elliptic curves inscribed in the angle $\alpha_5$ (FIGS. 2 to 5 and FIGS. 7 to 18B) by the dome 20 of arc of circle cross section or dome in the form of a portion of cylinder whose geometric centre is on the focal point of the transmitter/reflector.

All the rays transmitted in the inscribed angle $\alpha_5$ (which will always be less than 90°) from the axis of the bore are then thereby reflected on the back of the cylindrical dome 20 covered with reflecting material, and behave as a light image which has been turned to radiate towards the front of the transmitter/reflector inside the inscribed angle ($\alpha_{12}+\alpha_3$), defining an inverse light image as if these same rays came from the focal point or axis of the bore, and were only affected in their energy value with a reflection coefficient of the reflecting material applied to the back of the dome 20.

Thus the secondary radiating energy originating from the inscribed angle $\alpha_5$ is added to the primary radiating energy inscribed in the angle ($\alpha_{12}+\alpha_3$), inside which the rays are all directed towards the plane 19 situated at the front of the transmitter/reflector. At this level, all the radiating energy normally inscribed over 360° is therefore contained in the angle ($\alpha_{12}+\alpha_3$), and is then divided into two parts, i.e. the radiation according to the inscribed angle $\alpha_3$, and the inscribed radiation according to the inscribed angle $\alpha_{12}$.

Figure 7:
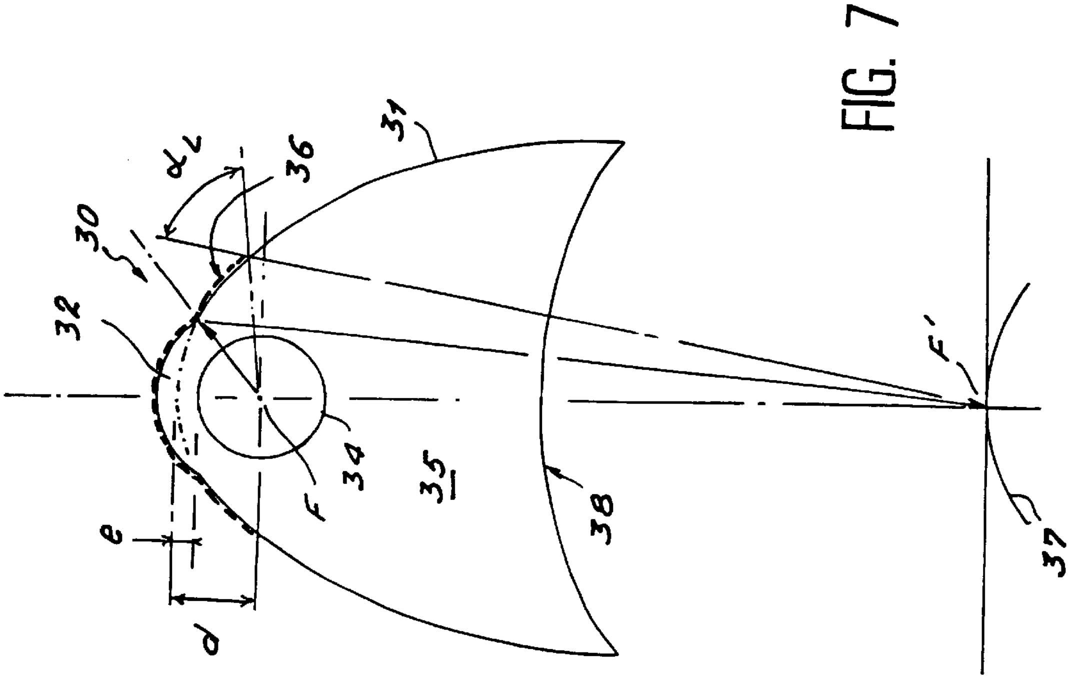
Figure 7A:
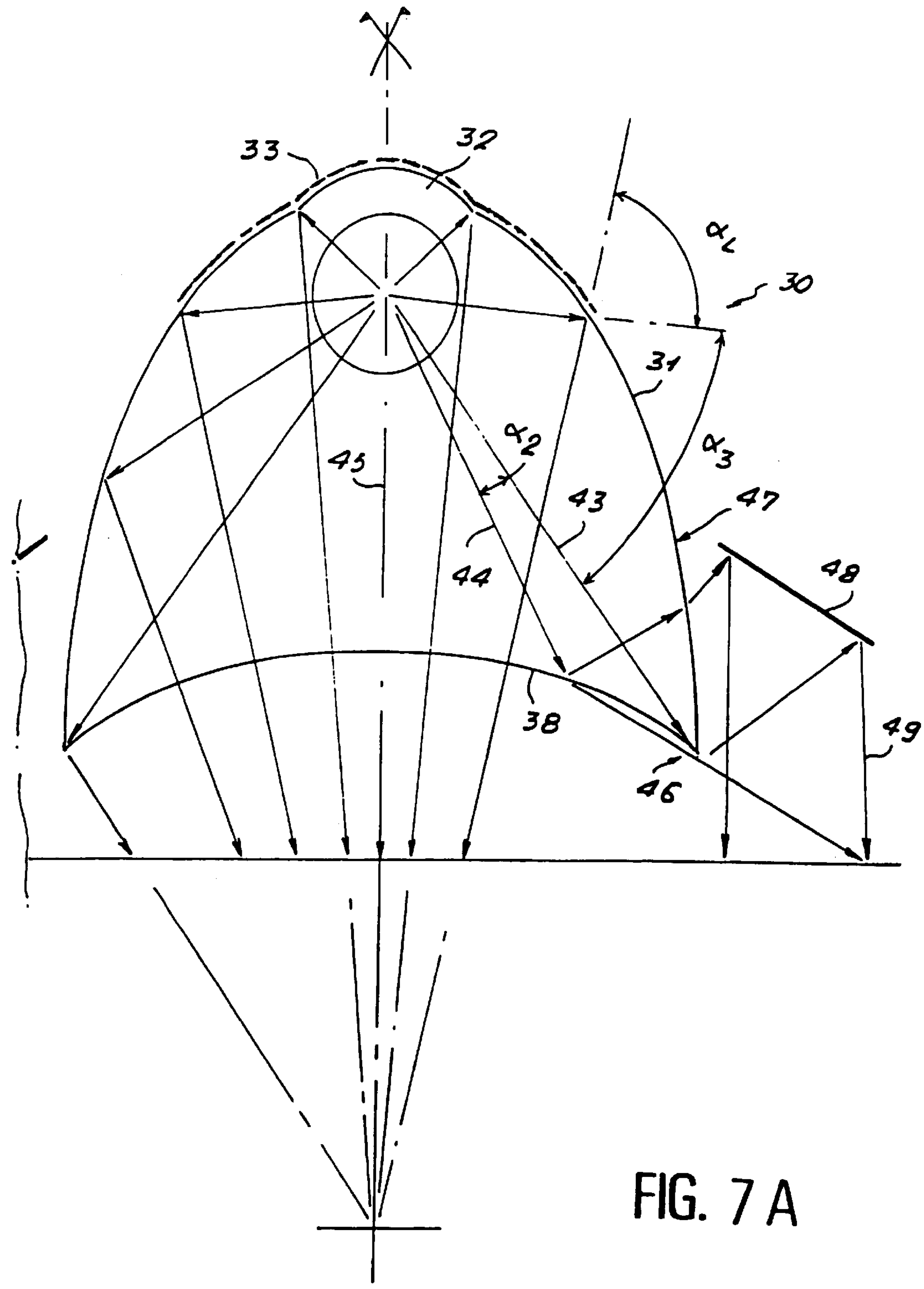
Figure 8:
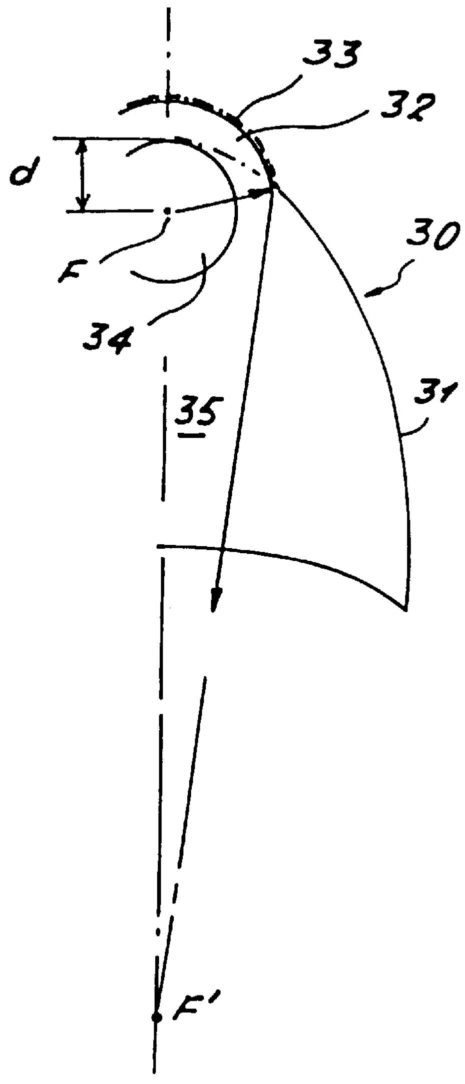
Figure 9:
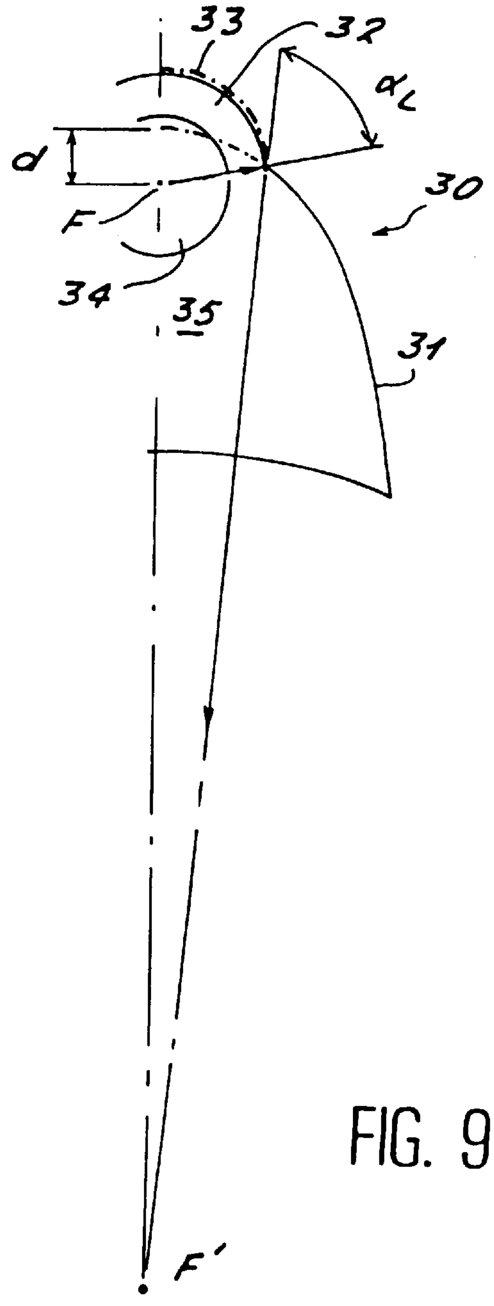

The embodiment of the transmitter/reflector device according to the invention corresponding to FIGS. 6 to 13 presenting an at least partly elliptic reflecting surface 31 will now be described, in which d=r+e (FIG. 6); r<d<r+e (FIGS. 7 and 7A); d=r (FIG. 8) and d<r (FIG. 9).

Here again the transmitter/reflector device is advantageously provided with a portion of cylindrical dome 32 covered with a fine layer 33 of reflecting material (in broken line in the figures), for example aluminium.

More precisely the device 30 comprises a cylindrical bore 34 and a solid quartz glass wall 35 which joins the wings 36 of the reflecting surface of elliptic cross section or in the shape of portions of ellipse, for example a half-ellipse of equation:

$$\frac{x^2}{(FF'+2d)^2}+\frac{y^2}{(FF'+2d)^2-\left(\frac{FF'}{2}\right)^2}=1$$

F and F' designating the focal points of the ellipse.

Figure 6:
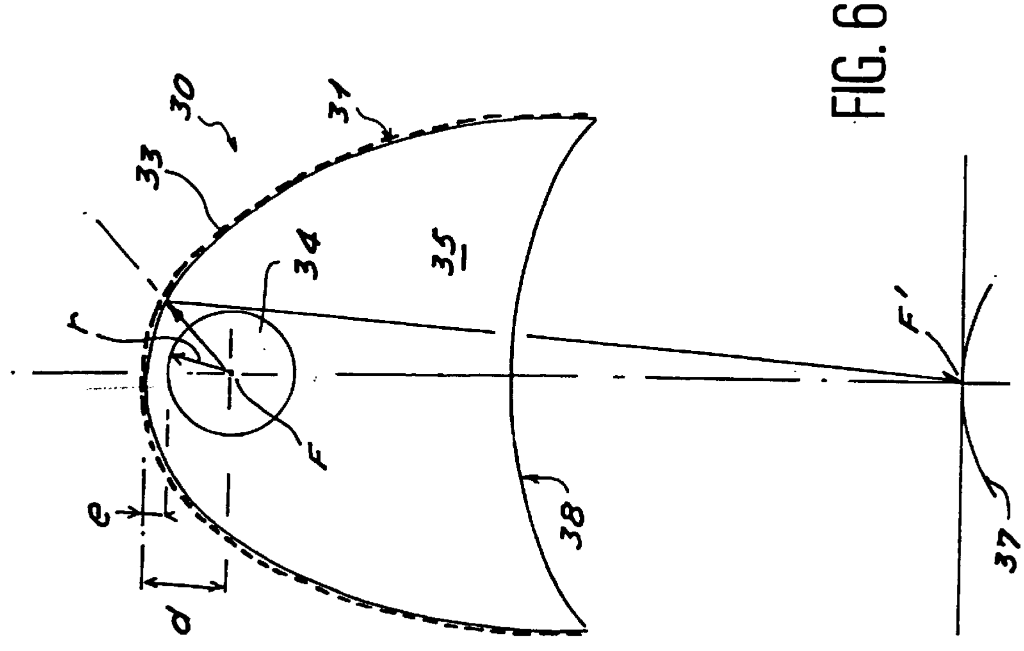

As in the case of FIG. 1, FIG. 6 shows a reflecting surface without upper dome, entirely covered with a layer of reflecting metallic material which concentrates the rays transmitted by the tube radiating towards the second focal point F'. In the case of FIGS. 7, 8 and 9 as in the case of FIGS. 2, 3 and 4, only the cylindrical dome 32, and possibly a portion 36 (FIG. 7) of the elliptic surface directly next to the dome with which it is joined is covered with reflecting material.

The wall of the dome therefore sends an inverse radiating image back to the focal point F, which retransmits a reflected ray to the elliptic walls as if this ray was originating from the focal point itself, with the same wavelength as the primary ray transmitted with energy E, but with an energy E'<E due to the absorption linked to the coefficient of reflection of the reflecting material deposited on the back of the dome.

The wall 35 is bounded towards the curved product to be treated 37 by a surface 38 of curved cross section arranged to be perpendicular to the largest number of rays originating from inside the device, to prevent them from being deviated, in a manner known to the man of the trade applying the laws of optics.

An example of calculation of the angle $\alpha_L$ is given hereafter.

In the embodiments of the invention more particularly described here, with upper reflecting dome of a determined angle in the centre $\alpha_5$ which will be specified hereafter, the remaining part of the parabolic or elliptic reflecting surface is not covered with reflecting material, reflection of the rays transmitted by the plasma disk on this remaining part, i.e. in the cone of angle $\alpha_3$ being performed by dioptric refraction, due to the different refractive indexes of the two refringent media which are the quartz and the surrounding gas.

However there exists a limit angle $\alpha_L$ which will depend on the wavelength of the ultraviolet rays transmitted and of the precise values of the refractive indexes of each of the media, above which any incident ray which meets the dioptric reflection curve 14 or 31 is fully reflected.

This limit angle $\alpha_L$ enables the above-mentioned angle at the centre $\alpha_5$ of the dome or portion of cylinder 20 or 32 to be determined so as to optimise the device so that dioptric reflection is used to its maximum.

Indeed, there is then no energy loss of the secondary radiation energy transmitted in relation to the primary radiation, which presents a great advantage.

Thus, the dioptric reflection fully restores the energy of the wavelengths lower than 250 nanometers which are often completely absorbed by the photoinitiators used on the products to be dried.

Optimising restoral of the energy of these wavelengths therefore considerably speeds up for example the polymerization process of the treated ink, and therefore the drying speed by factors much larger than the simple ratio of the energies.

On the other hand, reflection by a reflecting surface in general made of aluminium, which absorbs the energy of the wavelengths less than 250 nanometers is less favourable, although not excluded by the invention.

The invention therefore proposes a transmitter/reflector device:

whose shape of the dome in portion of a cylinder and that of the parabolic or elliptic reflecting surfaces of the wings, the refringence indices of the quartz and surrounding gas used, and the reflecting material used are arranged to enable all or appreciably all of the rays of determined wavelength and energy to be merged in a single unified and controlled, homogeneous flux, according to the required treatment defining the photochemical parameters to be retained to dimension said device, in an appreciably single direction, towards the product to be treated.

In the case of a parabolic transmitter/reflector device, the primary and secondary rays must be perpendicular to the irradiated plane, with a cosine equal to 1 according to Lambert.

In the case of an elliptic transmitter/reflector device, the rays are directed towards the focal point F' of the ellipse.

The invention also proposes (FIG. 10, to be compared with FIG. 5) a device of the type of FIG. 9 comprising a dioptric cavity 39 further improving the optical equilibrium of the light disk, with a shape calculated in a similar way to the cavity 22 of FIG. 5.

More precisely, the behaviour of the light rays within the scope of the device of FIG. 10 will now be described in detail.

This device present a combination arranged so that all the radiating energy is contained in the angle $\alpha_{12}+\alpha_3$ as has already been seen with reference to FIG. 5. The face 31, inscribed in the angle $\alpha_3$ then receives all the radiations comprised between the limits of the rays 40 and 41.

These light rays convey their energy in a refringent medium which is quartz, whose refraction coefficient value depends on the wavelength passing through it.

They then meet a dioptric curved surface whose second refringent medium is air or a gas (for example a neutral gas).

Thus, after the choice has been made on the wavelength(s) to be used and after the gas constituting the second medium has been determined, the limit angle of incidence $\alpha_L$ (such that any incident ray which meets the curved dioptric reflection surface 31 is fully reflected) is calculated, and the angle at the centre $\alpha_5$ of the axis merged with the axis of the bore is deduced therefrom according to the equation of the reflecting surface and the laws of optics.

An example of calculation of the angle $\alpha_L$ is given hereafter.

Likewise, with reference to FIG. 5, by constructing the curve of the parabola as that of the ellipse, and as has been seen, there exists a mathematical construction of the curves such that the limit angle of incidence $\alpha_L$ is the meeting point of the curve 20 or 42 as an arc of a circle with the curve 14 or 31 as a parabola or ellipse.

Here again the performance acquired is then remarkable knowing that:

- the polymerization rate of an ink or a varnish is closely linked to the reactivity of these photoinitiators used in this product,
- the influence on the photoinitiators is essentially due to the energies borne by wave lengths less than 250 nanometers,
- the metallic reflection coefficient for a treated aluminium to be ultraviolet reflective is about 0.4 for wave lengths comprised between 180 and 270 nanometers, and about 0.85 in the mercury spectrum, i.e. 360 nanometers.

For the same level of reactivity, three times more power is therefore required for a known transmitter of the prior art, called "without ozone", than for a transmitter called "with ozone".

Whatever the transmitted wavelengths on the other hand, the reflection coefficient on a dioptric surface is always equal to one in the direction of propagation of a ray moving from the solid transparent medium to the boundary of the gaseous transparent medium.

In the embodiments more particularly described, the back of the parabolic or elliptic curves under $\alpha_L$ not being covered with a reflective coating, this advantage is therefore to be found.

FIG. 7A shows an embodiment of the invention improving the performances of the device according to the invention even further using dioptric reflection.

It can in fact be noted that, for all the rays inscribed in the angle $\alpha_2$, the curve 38 functions like the curve 31.

Indeed, the rays according to $\alpha_2$, between the ray 43 and the rays 44, reach the curve 38 with an angle of incidence greater than the limit angle of the two refringent media.

The reflection is therefore total, the reflection coefficient being equal to 1.

Beyond this angle $\alpha_2$, in the direction of the axis 45 of the ellipse for example, the ray 46 goes off obliquely towards the outside.

But in the case of total reflection, the radiating energy is then entirely sent back onto the portion of curve formed by the parabolic 14 or elliptic (more particularly described here) wings to give the reflecting surface 31, where a new angle of incidence is close to 0.

The following situation is then observed: the portion of curve 47 operates in reflection for all the rays transmitted in the angle $\alpha_3$ and, at the same time, in transparency for all the rays transmitted in the angle $\alpha_2$.

The rays transmitted in the angle $\alpha_2$ exit by transparency from the transmitter/reflector in the portion of curve 47 and are then sent back by reflection obstacles 48 for example metallic, in the form of inclined longitudinal plates, flat or curved, according to the directions which are to be given to the reflected rays 49.

Likewise the use of a dioptric cavity may or may not be combined with the reflection obstacles 48.

The above comments and complementary elements are naturally also applicable to parabolic construction.

Another embodiment of a device according to the invention has been represented in FIG. 11 with a dome in the form of a cylindrical portion of different thickness e, i.e.: with e<R, where R is the external radius of the bore cylinder, as indicated by the mixed line 51, with e=R by the broken line 52 and with e>R, for example e=2R, by the unbroken line 53.

FIG. 12 shows a device 30 whose bore 34 comprises an internal face 54 provided with two longitudinal grooves 55 of cross section appreciably in the shape of a triangle of height for example ≦⅕ of the diameter of the bore, for example equal to 1/10th inscribed in the angle $\alpha_2$, whose external side 55' is parallel to the axial plane. The rays 43 and 44 bounding this angle $\alpha_2$ and the curve of the grooves 55 thus defines a portion of energy which irradiates on one side the first circular diopter 56 formed by the ultraviolet light disk (first refringent medium with n=1) on the quartz glass (second refringent medium with n=1.5) and is diverted the other side by the side faces of the grooves towards the side walls 31.

More precisely the grooves 55 each comprise a side face parallel to the axial plane 10 and inscribed in the angle $\alpha_2$ defining the dihedron in which the rays are entirely diverted by refraction onto the dioptric reflection curves 14 for the parabolic curve device and 31 for the elliptic curve device (FIG. 12).

FIG. 13 shows an alternative embodiment of the device 30, comprising a bore provided with a partially recessed lower part 60 forming a convex boss 62 on the lower internal face 61 corresponding to the angles $\alpha_{12}$ and whose radius of curvature R' is different from R in such a way that the rays refracted onto the dioptric curve 62 are then for example convergent.

The whole of the radiation inscribed in the angle $\alpha_1+\alpha_2=\alpha_{12}$, which defines a portion of energy irradiating the first diopter 56, also defines the portion of curve 62, of the recess 60, in such a way that all the refracted primary rays are reoriented either to be directed to the virtual focal point F' in the case of the ellipse or to be directed perpendicularly to the plane to be irradiated in the case of the parabola.

The whole of the rays inscribed in the angle $\alpha_2$ define a portion of energy irradiating the first vertical diopter parallel to the axis of the recess 60, in such a way that all the refracted primary rays are reoriented to be directed onto the dioptric reflection curves 14 for the parabola, 31 for the ellipse, where, on reflection on said dioptric curve, they appreciably take the same path as the reflected rays originating from the angle $\alpha_3$.

Thus, unlike known devices where the transmitter and reflector are physically separated and for which two sorts of directed rays can be distinguished, which are the primary rays and the secondary rays, the invention proposes a device which enables the whole of the primary radiation and secondary radiation to be united in a single homogeneous, unified and controlled flux in directions appreciably single and identical.

A shape of the light cross section of the beam is advantageously sought for such that the light half cross section situated on the side of the angle $\alpha_5$ is equal or appreciably equal to the light half cross section situated on the side of the angles $\alpha_1$ $\alpha_2$ and $\alpha_3$.

As has been seen (FIGS. 5 or 10) it is also possible to modify the dioptric curve 15 or 38, to reorient the radiation in such a way that the refracted rays originating from the corrected dioptric transparency curve are even more parallel to one another and perpendicular to the irradiated plane according to Lambert, or on the contrary are reoriented so as to obtain a radiating flux converging towards a virtual focal point F', or, inversely, a divergent radiating flux, by adding a dioptric cavity 22 or 39, in a manner within the scope of the means of the man of the trade.

The circular dioptric curve 65 is the geometric extension of the circular metallic reflection curve 11 or 42, in such a way that (cf. more precisely FIG. 11) any ray which leaves the focal point (like any light ray on this same trajectory) passes via the first circular dioptric curve 65 and the second circular dioptric curve 66 being diverted towards the virtual focal point situated in the axial plane.

All the rays reach the face 15 or 38 within the limits of the inscribed angle $\alpha_1$ in such a way that the primary rays all arrive perpendicular to the second diopter 67 (FIG. 11).

In the case of the ellipse, it is possible to modify the dioptric transparency curve (mixed line 68 in FIG. 11) even further to reorient the secondary rays originating from $\alpha_2$ and those originating from $\alpha_3$ in such a way that all the rays refracted on the corrected dioptric transparency curve 68 reconstitute a parallel radiating flux perpendicular to the irradiated plane with a cosine equal to 1 according to Lambert. It is also possible, in a manner within the scope of the means of the man of the trade using the laws of optics, to modify the dioptric transparency curve 15 of a parabolic transmitter/reflector (FIG. 5) to reorient all the refracted rays onto a corrected dioptric transparency curve (not represented) for example reconstituting a radiating flux converging towards a virtual focal point F' or a divergent radiating flux. The invention also proposes (FIGS. 14 to 18B) a device 70 comprising a cylindrical tube 71 drilled from end to end with a cylindrical bore 72.

The tube is equipped with two longitudinal side lugs 73 of internal surface 74 and external surface 75 presenting cross sections in the shape of portions of parallel parabolas, the external surface 75 constituting the portion of parabolic reflecting surface of the wing according to the invention.

The lugs have a width for example equal to the radius of the bore.

They are symmetrical in relation to the axial plane 76 passing through the generating line at the peak 77 and the focal point 78 merged with the axis of the bore 72.

The lower face 79 of the lugs for the parabolic shape is perpendicular to the plane 78 and situated in a plane 80 (in mixed line in the figures) tangent to the lower portion of cylinder of the tube 71 for example of thickness equal to half the radius of the bore.

The upper part of the tube constitutes, as described previously with reference to FIGS. 2 to 4, an upper dome 81, the arc at the peak of the parabola being entirely comprised in the thickness of the cylindrical wall (r<d<r+e) (FIG. 14), being tangent to the bore 72 (d=r) (FIG. 15) or being secant to the bore (d<r) (FIG. 16).

In the embodiments of the invention more particularly described here, e=r and the distance between the ends of the lugs 73 is equal to 7.4r.

Likewise, and as previously described, the bore can comprise longitudinal grooves 82 of isosceles or equilateral triangular cross section to redistribute the rays of the angle $\alpha_2$ either towards the inside as primary rays or towards the outside as secondary rays by dioptric or metallic reflection (FIG. 17), for example of height equal to about 1/10th of the radius of the bore.

In the embodiment of FIGS. 18, 18A and 18B, a longitudinal spur 83 of rectangular triangular cross section is on the other hand provided, whose external side wall is parallel to the axial plane 76, which enables recanting of the rays towards the axial plane 76 or parallel to said axial plane 76 to be improved even further, by making use of the laws of optics.

As an example, and with reference to FIG. 18, the calculation is given below enabling the parabola of the reflecting surface 84 to be constructed, for a radius of the light disk r=2 mm, a thickness of the quartz glass e=2 mm and a refractive index depending on the wavelength used.

It can be seen that for $\lambda$=200 nm, $n_{200}$=1.551

$$\sin\alpha 200 = \frac{1}{n200} = \frac{1}{1.551} = 0.6447,\ \alpha 200 = 40.14^\circ$$

and for $\lambda$=360 nm, $n_{360}$=1.475

$$\sin\alpha 360 = \frac{1}{n2} = \frac{1}{1.475} = 0.6779,\ \alpha 360 = 42.68^\circ$$

We will therefore take for the calculations $\alpha_L$=42° as reflection limit angle for wavelengths $\lambda$<360 nm.

The tangent to the parabolic curve being $$\text{tg}\,\frac{\alpha L}{2} = \text{tg}42^\circ = 0.9,$$

it is also the derivative of the equation of the parabola: y'=0.9.

Let us set down the equation of the parabola $$y = \frac{1}{a}x^2$$

This gives:

$$y + \Delta y = \frac{1}{a}(x + \Delta x)^2 = \frac{1}{a}(x^2 + 2x\Delta x + \Delta x^2)$$

$$\begin{aligned}\Delta y &= \frac{1}{a}(x^2 + 2x\Delta x + \Delta x^2) - y \\ &= \frac{1}{a}(x^2 + 2x\Delta x + \Delta x^2) - \frac{1}{a}x^2 \\ &= \frac{1}{a}(2x\Delta x + 2\Delta x^2)\end{aligned}$$

Which therefore gives:

$$y' = \frac{2}{a}x = \text{tg}\,\frac{\alpha L}{2}$$

According to the definition given before R=r+e=4 mm $$\sin 84° = \frac{xT}{R}$$

We can then calculate the coordinates at the point T; i.e.

$$X_T = R\sin 84° = 4\times 0.9945 = 3.978 \text{ mm}$$

For the coefficient "a" of the parabola this gives:

$$y' = \frac{2}{a}x = \text{tg}\frac{\alpha L}{2} \text{ at the point } T \text{ and}$$

$$a = \frac{2}{\text{tg}\alpha\frac{L}{2}}x \text{ with } X_T = 3.978 \text{ mm}$$

$$a = 8.83$$

$$\text{tg}42° = \text{tg}\frac{\alpha L}{2} = 0.9004$$

The equation of the parabola is therefore of the form $$y = \frac{1}{8.836}x^2$$

The significant points of the curve are then:

the point 85 ($X_T$;$Y_T$) of the dioptric tangent, with $X_T$=3.978 mm→then $Y_T$=1.7909 mm the point 86 ($X_f$=0;$Y_f$) of the generating line at the peak.

The distance from the focal point of the parabola to the peak of the latter (therefore for x=0) being $$y = \frac{a}{4} \text{ with } X_f = 0$$

This then results in $Y_f$=2.209 mm the point 87 ($X_1$;$Y_1$) of intersection of the axial plane 88 with the parabola with $Y_1$=2.209 mm, whence $X_1$=4.418 mm the end point 88 ($X_2$;$Y_2$) of the lug 73 with $Y_2$=(2.209+4) mm then $X_2$=7.4 mm.

FIG. 19 shows a device 90 with a parabolic reflecting surface 91 of the type with side lugs 92 as described with reference to the previous figures.

The cross section of the bore 93 is this time not circular but in the shape of a truncated circle whose upper parts 94 and lower parts 95, of cross section in the shape of a half-moon are kept solid, made of glass, symmetrically in relation to the plane 96 perpendicular to the axial plane 97 containing the generating line at the peak 98 of the parabola.

It has been observed that such an arrangement enabled a considerable increase of the efficiency to be achieved, in the change ratio of the light cross sections, in relation to a circular cross section 99 (in mixed line in FIG. 19), according to a law of the type $$\eta = \left(f\left(\frac{S2}{S1}\right)\right)^2$$

with $S_2$ the cross section of the circle and $S_1$ the cross section of the truncated circle.

In this embodiment the angle $\alpha_3=\alpha'_3+\alpha''_3$ is such that (for the radius and thickness values taken before with reference to FIG. 18)

$$\cos\alpha''3 = \frac{3.978}{4} = 0.9945 \Rightarrow \alpha''3 \cong 6°$$

$$\text{tg}\,\alpha'3 = \frac{7.4-2.209}{6.209} = 0.836 \Rightarrow \alpha'3 \cong 40°$$

$$\text{i.e. } \alpha 3 = 46°$$

To re-establish the equilibrium of distribution of the rays reflected upwards, the wall 100 of the dome 101 of the device 90 presents a flattened surface 102 in relation to that of a cylindrical dome 103 (in mixed line in the figure).

Its equation is calculated so as to enable a return of the rays transmitted 104 from the bore 93, in exactly reverse manner, the incident rays therefore having to strike the reflecting surface 102 perpendicularly.

FIG. 19A shows another monoblock device 105 with cylindrical bore comprising two lugs 106 of parabolic surface 106'. The lower face 107 is cylindrical, with an axis identical to the axis of the bore, and joins the internal ends 107' of the lugs to one another.

FIG. 19B shows a monoblock device 108 of the type described before with lugs and cylindrical bore, comprising on its lower internal surface a recess 109 provided with side faces 109' parallel to the axial plane and with a cylindrical lower face 109'', of radius equal to the external radius of the cap.

Here, the lugs have an elliptic surface, the lower face of the lugs being shaped as a portion of a cylinder.

Another embodiment of a device 110 according to the invention has been represented in FIGS. 20 to 25 comprising a transmitter tube 11 made of tubular quartz, separated from its reflecting wings 112 and 113 made of metallic reflecting material.

The transmitter/reflector couple nevertheless proceeds from the same geometric arrangement as the transmitter/reflector devices described above, where reflector and transmitter are securedly united to one another.

The reflector formed by the two wings 112 and 113 therefore presents a reflecting geometric shape whose geometry combines the arc of circle with the parabolic curve or with the elliptic curve.

The transmitter tube 114 for example cylindrical, is covered with a reflecting material 115 as shown in the figures, i.e. with a slight angle overlap with the wings.

It can adopt different shapes and be:

a circular transmitter with electrode chamber, according to the invention, a conventional transmitter, and/or a transmitter excited by microwaves.

FIGS. 21 to 24 schematically show the respective positions of the tube 114 in relation to the generating line at the peak 116 of the parabola partially forming the wings, for example made of aluminium, which is also true in the case of the ellipse. The separation between the transmitter and reflector here enables a circulation 117 of the coolant fluid.

FIG. 25 shows a device 118 with an ellipsoid reflecting surface, equally applicable to the parabolic shape.

FIG. 25 shows two symmetrical wings 120, terminated at the top part by a portion of cylindrical dome 121 and separated from one another by a longitudinal slit 122, through which a coolant fluid 123 can be inlet.

The top 124 of the cylindrical transmitter tube 125 is coated with a metallic layer 126 so as not to leave any escape angle for the transmitted rays, there being an overlap between the end of the portion of cylindrical dome 121 and said also partially cylindrical metallic layer 126.

FIGS. 26A, 26B and 26C show three embodiments of cylindrical tubes coated on the upper portion with a reflecting layer according to the invention.

FIG. 26A shows a tube 127 with a bore 128 in the shape of a cylinder truncated by a lower plane 129 perpendicular to the axial plane 130, for example situated at a distance equal to half the radius of the axis 131.

FIG. 26B shows another transmitter tube 132 comprising a recess 133 on the lower face 134 of the cylindrical bore. The recess comprises side walls parallel to the axial plane 135 and a lower face 136 in the form of a portion of cylinder of radius equal for example to the external radius of the tube.

A transmitter tube 140 according to the invention has been represented in FIGS. 27A, 27A', 27B and 27C with partially dissociated reflectors, of parabolic cross section shape.

More precisely the tube 140 (cf. FIG. 27A) is appreciably cylindrical, its upper part 141 and its bore 142 being of the flattened or truncated type described with reference to FIG. 19.

The upper part 141 is covered with a reflecting layer 143.

The tube (see FIG. 27A') can comprise a lower portion 141' whose external surface 141" enables the rays refracted by the truncated cavity of the bore to be diverted in parallel fluxes for example or, in the case where the same convex shape is used but more accentuated (with a smaller radius of curvature), a convergent flux to be diverted to the second focal point F', according to the laws of optics.

Figure 27B:
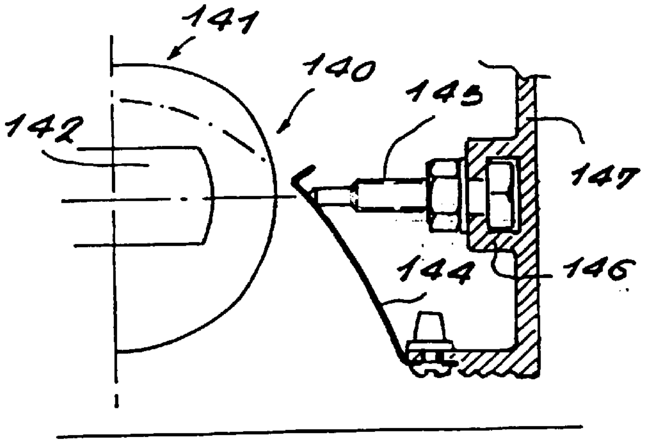

The wings 144 entirely at a distance from the transmitter tube are for example mechanically fixed slightly prestressed so as to keep them in mathematical position by a pin screw 145 (cf. FIG. 27B).

Figure 27C:
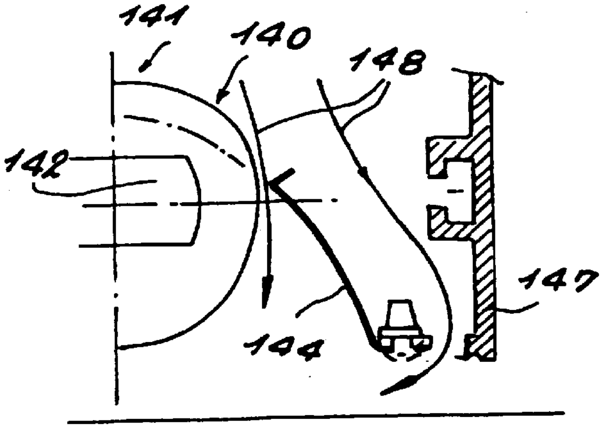

This screw is fixed in a groove 146 of the dryer support structure which may be of extruded aluminium profile. A hypothesis of cooling sweeping 148 is shown in FIG. 27C.

Figure 27D:
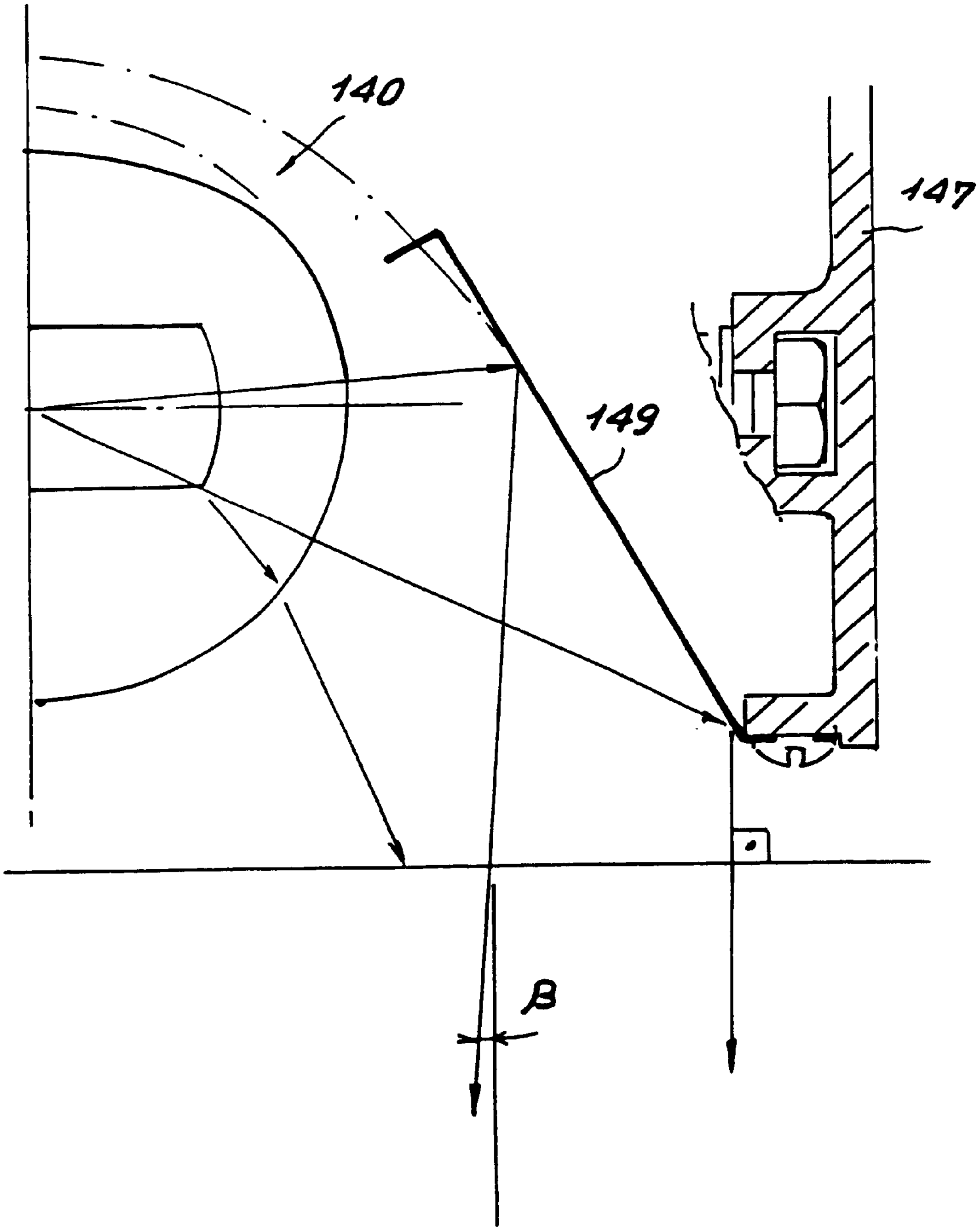

FIG. 27D shows an acceptable alternative version of the invention, comprising portions of flat, rectangular wings 149 extending along the tube and at a distance from the latter or not, the portions are tangent and/or appreciably identical to the parallel or elliptic section of the wings of the previous figures.

These portions according to the invention can therefore be appreciably assimilated to a parabola or ellipse, but easier to manufacture.

The invention more particularly applicable to ultraviolet transmitters with electrodes can easily be extended to the technology of the transmitter without electrode for which mercury or another metallic iodide is energized by microwave effect.

Several embodiments of a transmitter 150, 151, 152, 153 usable with the invention have been represented (FIGS. 28 to 31A).

In these embodiments more particularly described, a light disk of internal diameter "ID" of about 4 mm (and advantageously less) is provided for the whole radiating length "$L_{uv}$".

At each end, a chamber 154, 155, 156 is provided corresponding to the housing of the electrode (when it exists) and to the potential fouling and devitrification zone. In FIGS. 28 and 29 the diameter of the chamber "$D_{ce}$" is enlarged up to the usual value of 11 mm which, by experience, is recognised as being sufficient for correct operation of the electrode and for the mechanical strength of the quartz enclosure.

In FIG. 30, a structure with no electrode has been provided, for example in case of external excitation by microwave.

In the course of operation of a known transmitter, a milky zone is observed around the electrode which becomes progressively opaque over a certain length "$L_{ce}$", which is classically the length of the electrode chamber.

This length begins at the foot of the electrode and ends with the invention at the reduction of the internal diameter "ID".

To remedy this, it is therefore also proposed to provide a coating of reflecting material 157 over the whole external periphery of the chamber, designed to maintain a certain radiating temperature for the electrode. This coating is represented in dashed lines in FIGS. 28 to 31A.

The invention enabling drying of an ink or a varnish, by means of an ultraviolet transmitter, which does not depend so much on the increase of the linear powers as on the modification of the shape of the light disk and/or on the decrease of its cross section, this leads for the same result, to said linear powers being able to be lowered, which means that at low power (≦30 W/cm) no electrode chamber, even with a very small diameter (FIG. 31) is required.

An example of manufacture of a transmitter/reflector device is described hereafter, for the purposes of illustrating its ease of achievement, with reference to FIG. 28.

Figure 10:
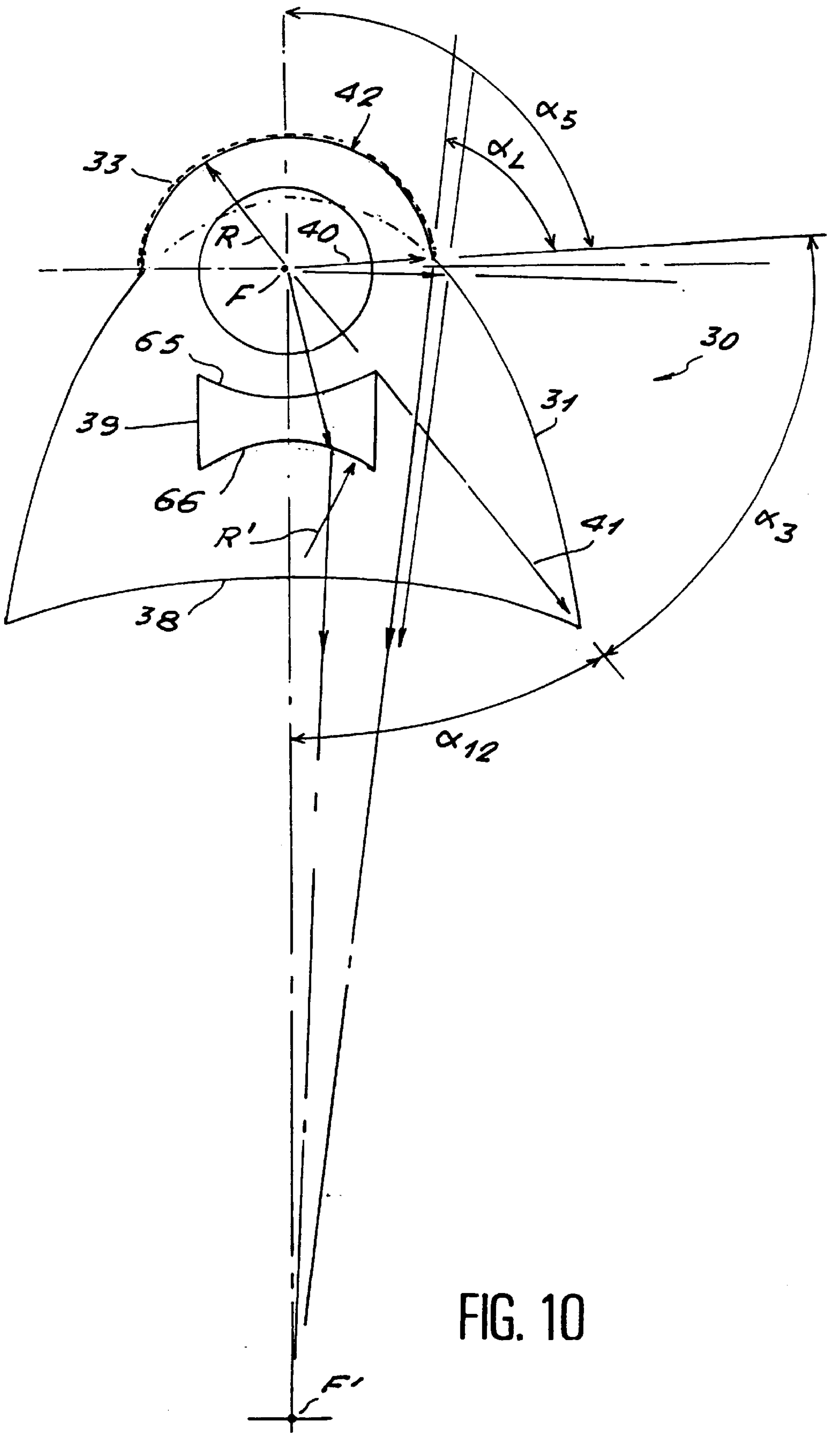

The transmitter/reflector device 150, also of the type of FIG. 10, comprises a body 160.

The end 161 of the body is first heated and is then crimped to the diameter of the electrode plug 162, achieved in the usual manner.

The plug comprises a ceramic end 163 as used for example by the Philips Company on its own manufactures.

Assembly in fact takes place in three stages:

The end of the transmitter/reflector device is prepared, over a length "$L_{ce}$", by cutting by milling at the level of the dioptric cavity, which is easy since the tube forming the transmitter enclosure is practically completed in its cylindrical configuration at the time of threading; then the quartz is heated to its softening temperature; the diameter is then flared to give it the external diameter of the electrode plug;

The electrode plug 162 is then mounted on the body 160 of the transmitter/reflector device by heating; complete fusion of one part on the other is thus created according to the same method as that used by the glass-maker to close the end of the transmitter.

Finally the ceramic end part 163 is fitted on the electrode plug after electrical connection has been made by welding.

The mercury is for its part inserted according to the usual manufacturing methods.

A reflection layer coating is then applied to the transmitter and to the ends of the transmitter/reflector and/or partly or totally on the wings.

On account of the low linear powers (≦30 Watts/cm), due to the large increase of the energy efficiency, it is possible, for transmitters of radiating length "$L_{uv}$" variable up to a little more than one metre, to increase the linear voltage up to a value of 30 volts/cm (i.e. 3000 volts in supply voltage, a value still used in the profession) which enhances the quality of the ultraviolet arc while preserving a current of maximum intensity of about 1 A.

The more conventional powers of 80 Watts/cm can naturally also be adopted, suitably modifying if necessary the ventilation required for cooling.

FIG. 32 shows in cross section several embodiments of the invention, whose transparent face presents different forms according to the desired applications.

Thus, FIG. 32A shows a cross section in the shape of a half-moon.

FIG. 32A' shows the same type of cross section, but with a lower cylindrical cap of the type described with reference to FIG. 19A.

FIG. 32B shows a bore of transverse cross section in the shape of an eye, the lower wall being convex.

FIG. 32C shows an embodiment of a device of the type of FIG. 1, with a large thickness of lower wall and a parabolic reflecting surface.

FIG. 32D gives a version with a bore of boomerang-shaped cross section, with a reflecting wall parallel to the bore.

FIG. 32D' gives another version with three bores, one central cylindrical bore and two side bores symmetrical in relation to the axial plane, of appreciably triangular cross section and whose walls are parallel on the one hand to the external walls of the device and on the other hand to the walls of the bore.

FIG. 32E shows yet another embodiment of a device, symmetrical in relation to an axial plane in the form of two portions of opposite parabolas or ellipses with cylindrical bore.

FIGS. 33 to 37 represent apparatuses comprising one or more devices corresponding to one or more of the types described above.

FIG. 33 is a schematic cross sectional view of an apparatus 200 according to the invention able to comprise two identical devices 201 situated on two opposite walls of a support structure 202.

With reference to FIG. 34, the invention therefore proposes an ultraviolet drying apparatus 200 whose support structure 202 is formed by a profiled tube 203 made of extruded aluminium which may be of square or rectangular, circular or ovoid shape, and comprising on its y-axis a single device or two devices 201 in opposition. More precisely, the transmitter/reflector device 201 of FIG. 33 is mounted in the profiled aluminium structure 203 for which the drawing of the internal shape called "cradle" 204 is identical to that of the convex shape 205 of the device.

A ventilation space 206 of about 1 mm is reserved between the two shapes.

The ventilation space is smaller than the air cross section of the profiled section so as to cause an appreciable pressure loss at the bottom of the device 201 and thus force the air flows 207 to become uniform at the back and on each side of the radiating device.

This "cradle" shape comprises at the peak a longitudinal slit 208 whose width is variable according to the direction of the ventilation in such a way that the air flow which sweeps the back of the device is constant over the whole length.

The transmitter/reflector device 201 is moreover held in position geometrically centred in relation to the profiled aluminium section by means of a securing part 209 fixed to each end of the device.

When the device is assembled, the securing part 209 slides simultaneously in the two internal grooves 210 of the profiled section and in the ceramic cylindrical end part 211 of the device.

It can be noted that the securing part 209 is for example formed by three floating elements enabling the transmitter/reflector device to be kept positioned in the centre of the aluminium profiled section while accepting manufacturing tolerances.

Its fixing is achieved by means of two bolts 212 housed and tightened in the bottom internal grooves 210 of the profiled section.

A cover 213 is moreover added at each end of the device enabling the longitudinal ventilation which is conveyed in the extruded profile as if a normal aeraulic sheath was involved, to be separated from the transverse ventilation which is distributed with appreciably laminar flow in the reserved space at the back 214 of the transmitter/reflector device.

Its assembly and mechanical fixing proceed from the same principle as the securing part 209.

At the ends of the device, there are slid in the top and bottom grooves 215 covers 216 which, once in place, position the device longitudinally in the profile.

Finally and for example in the transverse direction of the device, housed in the two bottom grooves, on each side, there are fixed two small pointed spacing wedges 217 to prevent thermal bridges.

These small wedges are designed to preserve the ventilation space and to keep the device 201 centred in the profile according to the two axes.

The external cover is for its part perforated at the level of the end lengths of the device with a longitudinal slit (not represented) of a length smaller than "$L_E$" (length of the end part) and of a width of about 3 mm to enhance the temperature drop of the ceramic end part at the foot of the electrode according to a gradient down to 300° C.

The external surface, on the width side of the profile, is provided with small grooves 218 which are as many inclined surfaces designed to prevent uncontrolled outlet of diffuse reflected rays.

The width opposite the radiating part is arranged with a narrow housing 219 (FIG. 35) designed to receive the electrical logistics (not represented) necessary for the dryer such as the wiring of the transmitters and that of the thermostatic and photometric control elements.

This same width may be envisaged to receive a possible second transmitter/reflector device 201.

Its cradle shape can also be used as a housing for the electrical wiring in use with a single transmitter/reflector.

On the two lengths of rectangular profile, on the external wall, there are also arranged rectangular grooves 220 enabling several dryers to be associated at the same time by means of spacers 221 whose variable width and shape enable a set of joined or separate dryers to be constructed, with an arrangement which may be straight or circular-shaped (FIG. 37), or square, or rectangular, or polygonal.

The spacers 221 thereby become the external and internal walls of the processing enclosure. Furthermore, the homogeneous shape of the profile enables a set of dryers to be just as easily assembled "head-to-tail" (FIG. 36) to achieve a minimum space occupation to process two sheets in "forward and return" manner (arrow 222). Finally, at each longitudinal end of the dryer (FIG. 34), the connection 223 of the ventilation duct is located on one side, and the electrical connections 224 of the transmitter, thermostatic relays, and photometric cell, on the other side.

The invention is applicable to non-fluorescent low pressure transmitters and for lamps radiating in visible light.

As far as the ventilation at each end of the transmitter is concerned, over the whole length "$L_{CE}$", the opening of the structure to air is much larger so as to enhance the temperature drop to values lower than or equal to 300°.

It can be noted that the radiating source is located in the circular curve 20 of the device (FIG. 2), where the temperature is the highest, whereas the two ends in the form of wings 14 are swept by a smaller external ventilation to take account of the expansion differences and to minimise the internal tensions.

Advantage is taken of the low expansion of quartz to ignore the temperature differences which exist between the circular enclosure of the tubular part called "of the transmitter" and the external ends of the elliptic or parabolic part "of the reflector".

As a reminder, the distribution of the ventilation designed to maintain the operating temperatures at different points of the radiating elements is known to the man of the trade who plays on the dimensions of the holes, their position, on the choice of fan and its characteristics (flowrate/pressure) to model the aeraulic currents to the thermomechanical necessities of the radiating element.

On account of the good mastery of the air flows circulating around the radiating element with the invention, the flowrate necessary for the thermal equilibria remains less than 50 $m^3$/h/kW.

It is interesting here to set out five advantages provided by the transmitter/reflector device according to the invention:

At the same polymerization capacity of a known drying system, the blowing ventilation necessary for cooling of the radiating element is considerably reduced to the point of being able to be easily integrated in the lost volumes of the printing machine.

The transmitter/reflector device not having any mechanical reflection surface or radiating surface swept by the ventilation, filtering of the air is not necessary.

A consequence of the second advantage, the radiating element not having any mechanical reflection surface in air, degrading of the reflection coefficient in time is impossible and its reflecting quality is not impaired.

Consequently, due to the almost total absence of air flow under the radiating part, except by Venturi effect of the running sheet, the quantity of ozone is imperceptible to the measuring elements, and extraction ventilation being of no purpose, the risk of oxidation of the metallic parts of the machine becomes negligible.

Due to the small quantity of ventilated air, an antioxidant aeraulic cover can moreover be provided, if the product requires, by replacing, for example, the air by nitrogen.

The numerous advantages of the invention are notably due to the following seven parameters:

the reduction of the light cross section, the non-circular shape of the light disk, the reduction of the path followed, the absence of ozone, the dioptric reflection curve, with a reflection coefficient 1, the dioptric transparency curve, with a cosine of about 1, the high power density.

To sum up and moreover in non-exhaustive manner, the advantages of the invention are the very low linear power for identical photochemical results, consequently and in the same proportions, the reduction of the stray thermal energy; the directivity of a homogeneous flux parallel to the constant power density; the unimpairable nature of the reflecting surface, and consequently the absence of filtering device; the absence of measurable ozone; the low cooling ventilation which makes the aeraulic installation insignificant; the greatly reduced electrical arrangements and cabinet dimensions; the extreme simplification of manufacture of the dryer; the greatly reduced dimensions of the dryer in relation to the competition; the installation of the ultraviolet dryer directly in the inking or varnishing station; the transmitter/reflector, the only component with a lifetime; the elimination of the buckling effect called "banana" effect, etc.

FIGS. 38A, B and C show top views of the apparatuses according to the invention comprising several apparatuses 200 arranged to dry a sheet of products 225.

FIG. 38A shows apparatuses 200 arranged perpendicularly to the running direction 226 of the products in left/right alternation, with a slight overlap at the centre of the product.

Figure 38B:
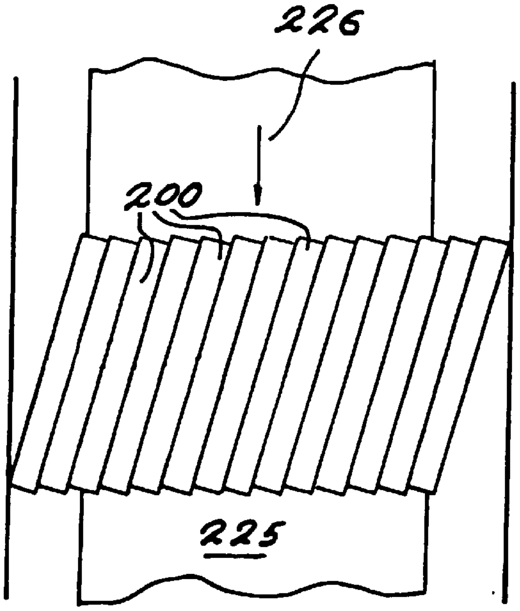
Figure 38C:
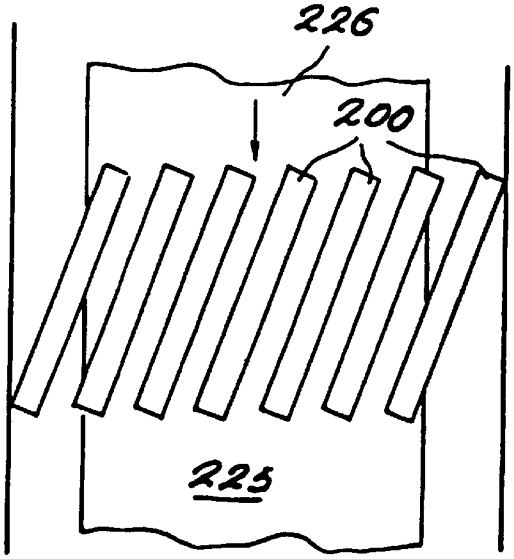

FIGS. 38B and C show apparatuses 200 arranged obliquely in relation to the running direction with an angle comprised between 5° and 20°, advantageously 15° to distribute the rays homogeneously.

FIG. 39 shows three distribution curves of the light density in a cylindrical tube 300.

The cylindrical tube 300; for example of small diameter (<10 mm), is placed at the focal point 301 of a reflecting parabola 302 (cf. FIG. 40A).

The curve 303 shows an appreciably homogeneous distribution, the plasma 303' (cf. FIG. 40B) occupying the whole of the volume of the tube, for example with a linear voltage, for a tube a few centimetres in length, of 5 Volts/cm.

The curve 304 shows the density distribution 304' for a voltage between electrodes of 30 Volts/cm and curve 305 the distribution of the plasma 305' for a voltage of 100 Volts/cm.

In this case the plasma beam is almost linear, with a cross section close to a pin-point, and away from the walls 306.

In the case of FIG. 40B, the reflecting wall 307 is of hyperbolic transverse cross section, the rays 308 emitted by the beam being sent back to the focal point 309, without interferences with the beam 305'.

FIG. 41 shows a device 110 comprising a cylindrical tube of constant cross section 111 of small diameter, for example smaller than 9 mm, provided with two wings 112 of transverse cross sections in the shape of a portion of ellipse, covered by a reflecting material, separated at their peak by a slit 113, for example with a width of from 1 to 5 cm.

The device comprises a horizontal flat plate 114, facing the tube 111 entirely at a distance from the wings.

The distance d between axis and upper generating line of the ellipse is such that d=f and d≦r+e+1 mm (f=distance to the focal point; r=radius of the tube; e=thickness of the tube), said plate being reflecting of the rays transmitted by a plasma beam 115 of diameter less than that of the internal bore of the tube. The plate (sheet metal) acts as support for the whole of the transmitter/reflector.

It is situated at a distance h, for example from 10 mm to 3 cm, and is fixed for example by spacers (not represented) on which the flat edges 116 of the upper end of the wings rest.

The lower face 117 of the plate 114 situated facing the slit 113 is rendered reflecting by sticking, depositing or film casting of a reflecting material, orifices 118 for passage of the cooling air 119 being provided on the sides.

Naturally, and moreover as results from the foregoing, the present invention is not limited to the embodiments more particularly described, but on the contrary encompasses all the alternative versions and in particular and for example those where the cross section of the light disk is more flattened, or even laterally truncated.

The invention also relates to apparatuses which enable sterilization of the water around an axis and drying of ink and varnish to be polymerized on wire products or circular around an axis such as marking of electric wires, cables, rubber hoses, PVC tubes, etc.

An ultraviolet transmitter/reflector according to the invention can thus be fitted on a sterilization or polymerization chamber for example in opposition around a transparent cylinder acting as sterilization or polymerization chamber.

The apparatus for processing axial products can for its part comprise several radiating devices, for example three, five or seven, arranged regularly in a star shape around a transparent cylinder acting as sterilization chamber.

What is claimed is:

1. An electromagnetic radiation transmitter/reflector device comprising a straight transparent quartz electrode tube with an end-to-end bore for retaining an ionising gas under pressure, extending elongate around an axis and defining a radiation transmitter beam, and a surface for reflecting the transmitted radiation comprising two longitudinal side wings symmetrical in relation to an axial plane of the bore, said reflecting surface being at least partially secured to the transmitter tube and presenting a transverse cross section at least partially strictly or appreciably parabolic or elliptic, wherein a diameter of the bore surface of the tube is smaller than or equal to about 9 mm, and a portion of the reflecting surface corresponding to the side wings and presenting a transverse cross section at least partially parabolic or elliptic belong to a curve whose generating line at the peak is situated at a distance d from the axis of the bore, in the axial plane of symmetry such that:

$d=f$ and $0<d<r+e+1$ mm, where:

- f: distance between the focal point of the parabola or ellipse and the corresponding generating line at the peak,
- r: distance between the axis and the internal surface of the bore in the axial plane, on the same side as the generating line at the peak, and
- e: thickness of the tube in the axial plane, on the same side as the generating line at the peak.

2. The device according to claim 1, characterized in that $d=r+e$.

3. The device according to claim 1, characterized in that $r\leqq d<r+e$.

4. The device according to claim 1, characterized in that $d\leqq r$.

5. The device according to claim 1, characterized in that the bore is cylindrical.

6. The device according to claim 1, characterized in that the transverse cross section of the bore is of at least a partially truncated circular shape.

7. The device according to claim 1, characterized in that the reflecting surface is entirely secured to said tube.

8. The device according to claim 7, characterized in that the external wall of the tube comprises a dome situated on the same side as the generating line at the peak in relation to the bore, of external surface designated to suit the internal wall of the bore and arranged to send the transmitted rays back to the dome, returning to the centre of the bore, said dome being covered with a layer of reflecting material.

9. The device according to claim 8, characterized in that the dome comprises an external reflecting face situated at a distance x from the axis of the bore, such that:

$r<x\leqq 2y$, where:

- y: distance between the internal surface of the bore and the point of discontinuity of the slope of the reflecting surface of the wing.

10. The device according to claim 8, characterized in that the tube is in the shape of a cylinder provided with two longitudinal side lugs symmetrical in relation to the axial plane passing through the generating line at the peak, directed towards the irradiation plane and whose respective external surfaces form the wings in the shape of a portion of parabola or ellipse.

11. The device according to claim 10, characterized in that the end faces of the lugs are perpendicular to the axial plane containing the generating line at the peak.

12. The device according to claim 10, characterized in that the end faces of the lugs are concave and arranged to direct the incident rays on said faces towards the axial plane of the bore containing the generating line at the peak.

13. The device according to claim 10, characterized in that the cylindrical bore comprises on its internal surface opposite the generating line at the peak, two protuberances of triangular cross section symmetrical in relation to the axial plane containing said generating line at the peak, said protuberances each comprising a wall parallel to the axial plane and such that the angle at the centre of the bore in which they are inscribed passes via the two end tips of the corresponding lug.

14. The device according to claim 7, characterized in that the tube is solid between the ends of the side wings whose internal faces form at least partially said reflecting surface by dioptric reflection.

15. The device according to claim 7, characterized in that the reflecting surface is entirely covered with a coating of reflecting material.

16. The device according to claim 7, characterized in that the reflecting surface is of parabolic or partially parabolic cross section and the tube comprises an external face joining the ends of the wings, situated on the opposite side from the generating line at the peak in relation to the bore, flat and perpendicular to the axial plane containing said generating line at the peak.

17. The device according to claim 16, further comprises in addition longitudinal reflecting side plates situated one each side of the ends of the wings, symmetrically in relation to the axial plane.

18. The device according to claim 7, characterized in that the reflecting surface is of elliptic or partially elliptic cross section and the tube comprises an external face joining the ends of the wings, situated on the opposite side from the generating line at the peak relation to the bore, concave, according to a curve symmetrical in relation to the axial plane containing the generating line at the peak, said external face being arranged to direct the transmitted rays at least partially towards the axial plane of the bore.

19. The device according to claim 7, characterized in that the tube comprises, on the opposite side from the generating line at the peak, a portion of partially recessed solid quartz forming a longitudinal dioptric cavity, said recessed portion comprising a convex face shaped as a portion of a cylinder, directed towards the side where the axis of the tube is located and situated at a distance r+e from said axis.

20. The device according to claim 19, characterized in that the cross section of said external face is flat over a first part centred in relation to the axial plane, and curved to over a second part.

21. The device according to claim 1, characterized in that the bore comprises an internal face, on the side opposite the generating line at the peak in relation to the axis, provided with a longitudinal dioptric recess presenting a bottom wall in the form of a portion of cylinder of radius r' equal to or different from r and side walls parallel to the axial plane of the bore.

22. A device according to claim 1, characterized in that the upper portion of the external surface of the tube is covered with a reflecting material, and that the two side wings are entirely situated at a distance from the transmitter tube.

23. The device according to claim 22, characterized in that the side wings entirely situated at a distance from the tube and presenting an at least partially parabolic or elliptic cross section, are extended at the upper part by a cylindrical portion coaxial with the bore.

24. The device according to claim 22, characterized in that the two side wings are formed by longitudinal reflecting plates.

25. The device according to claim 1, characterized in that the tube comprises electrode chambers of internal cross section greater than or equal to the internal cross section of the radiation transmitter beam of said tube.

26. The device according to claim 1, characterized in that the maximum cross section of the transmitter beam is smaller than or equal to about 45 $mm^2$, to about 30 $mm^2$ or even to about 10 $mm^2$.

27. An apparatus for processing products arranged as a flat sheet, a wire or a cylinder, by ultraviolet rays, comprising at least one device according to claim 1.

28. The apparatus according to claim 27, further comprises a drying apparatus having cooling means arranged to make a cooling gas flow outside at least a part of the reflecting surface of the device.

29. The apparatus according to claim 27, further comprises at least two devices directed in the opposite direction.

30. The apparatus according to claim 27, further comprises several devices arranged obliquely in relation to the running direction of the products to be processed.

31. The apparatus according to claim 27, further comprises several devices arranged angularly in relation to one another.

32. A process for applying rays to a product in the form of a sheet or disposed on a flat or curved surface, comprising:

irradiating said product with an ultraviolet ray plasma beam extended elongate around an axis of constant transverse cross section smaller than or equal to about 45 $mm^2$, said beam being generated by the electromagnetic transmitter/reflector device in an electrode tube according to claim 1.

33. The process according to claim 32, characterized in that said product is irradiated with a cylindrical ultraviolet ray plasma beam extended elongate around an axis of cross section smaller than or equal to about 30 $mm^2$.

34.The process according to claim 33, characterized in that said product is irradiated with a cylindrical ultraviolet ray plasma beam extended elongate around an axis of constant transverse cross section smaller than or equal to about 10 $mm^2$.

35. The process according to claim 34, characterized in that the product is irradiated with primary rays originating directly from the plasma beam and simultaneously with secondary rays originating from the primary rays by dioptric refraction on a reflecting wall presenting an at least partially parabolic transverse cross section.

36. The process according to claim 32, characterized in that the product is irradiated with primary rays originating directly from the plasma beam and simultaneously with secondary rays originating from the primary rays by dioptric refraction on a reflecting wall presenting an at least partially elliptic transverse cross section.

37. The process according to claim 32, characterized in that the product is irradiated with rays entirely originating from and reflected by a single tube confining the plasma beam, comprising a reflecting surface securedly united to the transmitter tube of said plasma beam.

38. The process according to claim 32, characterized in that the length of the cylindrical plasma beam of constant cross section is greater than thirty centimetres.

39. The process according to claim 38, characterized in that the length of the plasma beam of constant cross section is greater than one metre.

40. The process according to claim 32, characterized in that the linear voltage of the plasma beam has a value greater than about 30 Volts/cm.

41. The process according to claim 40, characterized in that the linear voltage has a value greater than or equal to 50 Volts/cm.

42. The process according to claim 41, characterized in that the linear voltage is about 100 volts/cm.

43. The process according to claim 32, characterized in that the length of the plasma beam transmitting the ultraviolet rays is greater than about 1 m 50 and the linear voltage is greater than 20 Volts/cm.

44. The process according to 32, characterized in that irradiation is performed with a plasma beam transmitting ultraviolet rays in the shape of a truncated cylinder.

45. An electromagnetic radiation transmitter/reflector device implementing the process according to claim 32, and that further comprises two reflecting wings separated by a longitudinal median slit, said wings presenting an at least partially appreciably parabolic, or appreciably elliptic, transverse cross section, said wings belonging to a curve whose generating line at the peak is situated at a distance d from the axis of the bore, such that: $d=f$ and $0<d<r+e+1$ mm where:

f: distance to the focal point r: radius of the tube e: thickness of the tube and that further comprises facing the slit a flat reflecting plate entirely at a distance h from the peak of the wings.

46. The device according to claim 1, characterized in that the radius of the transverse cross section of the plasma beam, in relation to the diameter equivalent to d of the tube is such that:

$$\frac{1}{100} d \le r \le \frac{1}{2} d.$$

* * * * *